United States Patent
Li

(10) Patent No.: US 11,937,183 B2
(45) Date of Patent: Mar. 19, 2024

(54) METHOD AND DEVICE FOR MONITORING POWER-SAVING SIGNAL

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 426 days.

(21) Appl. No.: 17/285,891

(22) PCT Filed: Oct. 19, 2018

(86) PCT No.: PCT/CN2018/111060
§ 371 (c)(1),
(2) Date: Apr. 15, 2021

(87) PCT Pub. No.: WO2020/077622
PCT Pub. Date: Apr. 23, 2020

(65) Prior Publication Data
US 2021/0377864 A1    Dec. 2, 2021

(51) Int. Cl.
*H04W 72/044*    (2023.01)
*H04W 52/02*    (2009.01)
*H04W 72/23*    (2023.01)

(52) U.S. Cl.
CPC ... *H04W 52/0232* (2013.01); *H04W 52/0235* (2013.01); *H04W 72/044* (2013.01); *H04W 72/23* (2023.01)

(58) Field of Classification Search
CPC ........ G01S 13/765; G01S 5/0205; G01S 5/10; G01S 1/20; G01S 11/06; G01S 13/75;
(Continued)

(56) References Cited

U.S. PATENT DOCUMENTS 10,863,570 B2 * 12/2020 Cirik .................. H04W 76/19
11,128,359 B2 * 9/2021 Zhou .................. H04W 80/02
(Continued)

FOREIGN PATENT DOCUMENTS

CN         1960355 A     5/2007
CN       101155355 A     4/2008
(Continued)

OTHER PUBLICATIONS

CATT:"BWP for Beam Failure Recovery", 3GPP Draft; R2-1800160 3GPP vol. RAN WG2 No. Vancouver Canada• Jan. 22, 2018-Jan. 26, 2018 Jan. 12, 2018 (Jan. 12, 2018), XP051386045, Retrieved from the Internet: URL:http://www.3gpp.org/ftp/tsg%5Fran/WG2% 5FRL2/TSGR2%5FAHs/2018%5F01 %5FNR/Docs/ [retrieved on Jan. 12, 2018].
(Continued)

*Primary Examiner* — Nathan S Taylor
(74) *Attorney, Agent, or Firm* — Syncoda LLC; Feng Ma

(57) ABSTRACT

A method for monitoring a power-saving signal includes: configuring a first power-saving signal parameter used for monitoring a power-saving signal for a first BWP; generating power-saving signal configuration information, said power-saving signal configuration information being used for indicating to use the first power-saving signal parameter on the first BWP for monitoring the power-saving signal; sending the power-saving signal configuration information to a terminal so that the terminal monitors the power-saving signal in light of the first power-saving signal parameter on the first BWP according to the power-saving signal configuration information.

18 Claims, 23 Drawing Sheets

---

A binding relationship between the BWPs which are configured for the terminal by the base station and power-saving signal parameters is established — 310

The binding relationship between BWPs and the power-saving signal parameters is added to the power-saving signal configuration information — 320

The power-saving signal configuration information carrying the binding relationship between BWPs and the power-saving signal parameters is transmitted to the terminal — 330

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 52/0206; H04W 52/0212; H04W 52/0225; H04W 52/0251; H04W 52/0229; H04W 84/12; H04W 88/06; H04W 52/02; H04W 56/0045; H04W 84/04; H04W 56/0005; H04W 56/004; H04W 84/047; H04W 52/0216; H04W 52/0219; H04W 52/0232; H04W 52/0235; H04W 72/044; H04W 72/0453; H04W 72/23; H04W 52/0248; H04W 72/20; H04W 72/04; H04L 43/106; H04L 5/00; H04B 17/27; Y02D 30/70

See application file for complete search history.

(56) References Cited

U.S. PATENT DOCUMENTS

| | | | | |
|---|---|---|---|---|
| 11,153,060 | B2* | 10/2021 | Babaei | H04W 76/28 |
| 11,159,959 | B2* | 10/2021 | Zhou | H04L 5/0057 |
| 11,190,255 | B2* | 11/2021 | Zhou | H04B 17/309 |
| 11,452,032 | B2* | 9/2022 | Gupta | H04W 52/0261 |
| 2016/0374022 | A1 | 12/2016 | Ang | |
| 2018/0279274 | A1* | 9/2018 | Sun | H04W 72/23 |
| 2019/0313332 | A1* | 10/2019 | Wu | H04W 52/0219 |
| 2020/0029316 | A1* | 1/2020 | Zhou | H04W 74/0833 |
| 2020/0107266 | A1* | 4/2020 | Liao | H04W 52/0229 |
| 2021/0014791 | A1* | 1/2021 | Freda | H04W 52/0277 |
| 2021/0136809 | A1* | 5/2021 | Xu | H04L 5/0053 |
| 2021/0144646 | A1* | 5/2021 | Xu | H04W 76/28 |
| 2021/0185651 | A1* | 6/2021 | Seo | H04W 24/08 |
| 2021/0235492 | A1* | 7/2021 | Iyer | H04W 72/0453 |
| 2021/0321446 | A1* | 10/2021 | Lee | H04L 5/0094 |
| 2021/0329556 | A1* | 10/2021 | Kim | H04W 52/0251 |
| 2022/0015034 | A1* | 1/2022 | Miao | H04W 52/0235 |
| 2022/0039019 | A1* | 2/2022 | Xia | H04W 52/0216 |

FOREIGN PATENT DOCUMENTS

| | | |
|---|---|---|
| CN | 101707796 A | 5/2010 |
| CN | 103228015 A | 7/2013 |
| CN | 105165063 A | 12/2015 |
| CN | 108024319 A | 5/2018 |
| CN | 108377551 A | 8/2018 |
| WO | 2012137690 A1 | 10/2012 |
| WO | 2016119281 A1 | 8/2016 |
| WO | 2018137553 A1 | 8/2018 |
| WO | 2018182414 A1 | 10/2018 |
| WO | WO-2019140341 A1 * | 7/2019 ........... H04B 17/373 |

OTHER PUBLICATIONS

Mediatek Inc:"Fallback mechanism for Bandwidth part operation",3GPP Draft; R2-1708045 Fallback Mechanism for Bandwidth Part Operation 3GPP vol. RAN WG2 No. Berlin, Germany; Aug. 21, 2017-Aug. 25, 2017 Aug. 20, 2017, (Aug. 20, 2017), XP051317955, Retrieved from the Internet:URL:http://www.3gpp.org/ftp/Meetings_3GPP SYNC/RAN2/Docs/[retrieved on Aug. 20, 2017].

Supplementary European Search Report in the European application No. 18936916.8, dated Oct. 21, 2021.

English translation of the Written Opinion of the International Search Authority in the international application No. PCT/CN2018/111060, dated Apr. 28, 2019.

Apple Inc. "UE-assisted Approaches for UE Power Saving", 3GPP TSG RAN WG1 #94-bis, R1-1811128, Oct. 12, 2018(Oct. 12, 2018), Proposals 5 and 6.

LG Electronics. "Discussions on Triggering Signaling for UE Power Saving", 3GPP TSG RAN WG1 #94-bis, R1-1810308, Oct. 12, 2018(Oct. 12, 2018), entire document.

Qualcomm Incorporated, "Triggering Adaptation of UE Power Consumption Characteristics", 3GPP TSG-RAN WG1 Meeting #94bis R1-1811283, Oct. 12, 2018(Oct. 12, 2018).

International Search Report in the international application No. PCT/CN2018/111060, mailed on Apr. 28, 2019.

Second Office Action of the Chinese application No. 201880002270. 2, dated Feb. 20, 2021.

Apple Inc, "BWP of Size Zero for UE Power Saving", 3GPP TSG-RAN WG1 #91 R1-1720546, Reno, US, Nov. 27-Dec. 1, 2017, the whole document. 6 pages.

Qualcomm Incorporated, "Remaining Issues on BWP", 3GPP TSG RAN WG1 Meeting AH 1801 R1-1800879, Vancouver, Canada, Jan. 22-26, 2018, the whole document. 13 pages.

Potevio, "BWP switch on C-DRX", 3GPP TSG RAN WG2 Meeting #100 R2-1712969, Reno, USA, Nov. 27-Dec. 1, 2017, the whole document. 3 pages.

* cited by examiner

METHOD AND DEVICE FOR MONITORING POWER-SAVING SIGNAL

CROSS-REFERENCE TO RELATED APPLICATION

The present application is a national stage of International Application No. PCT/CN2018/111060 filed on Oct. 19, 2018, the disclosure of which is hereby incorporated by reference in its entirety.

TECHNICAL FIELD

The present disclosure relates to the field of communication technology, more particularly to a method and device for monitoring a power-saving signal.

BACKGROUND

To achieve the purpose of power saving, a power-saving signal is introduced in a next generation communication system. In the related art, power-saving signal parameters are generally statically configured. However, the flexibility of the static configured power-saving signal parameters are poor, which causes a large amount of power consumption.

SUMMARY

To overcome the problems in the related art, embodiments of the present disclosure provide a method and device for monitoring a power-saving signal.

According to a first aspect of the disclosure, there is provided a method for monitoring a power-saving signal, applied to a base station configuring at least one Bandwidth Portion (BWP) for a terminal, the method includes that:

a first power-saving signal parameter for monitoring the power-saving signal is configured for a first BWP;

power-saving signal configuration information is generated, the power-saving signal configuration information is configured for indicating to perform a power-saving signal monitoring over the first BWP using the first power-saving signal parameter;

the power-saving signal configuration information is transmitted to the terminal, to enable the terminal to perform the power-saving signal monitoring over the first BWP according to the first power-saving signal parameter based on the power-saving signal configuration information.

Optionally, the first power-saving signal parameter may include at least one of the following information:

a first information configured for characterizing a transmission period of the power-saving signal;

a second information configured for characterizing a start-end time of the power-saving signal; or a third information configured for characterizing a duration of the power saving signal.

Optionally, the start-end time of the power-saving signal include a starting time of the power-saving signal and/or an ending time of the power-saving signal within the transmission period, the starting time and/or the ending time is/are an offset value for a specified reference point.

Optionally, the first BWP is any one of BWPs which are configured for the terminal by the base station;

the power-saving signal configuration information is transmitted to the terminal may include that:

a binding relationship between the BWPs which are configured for the terminal by the base station and power-saving signal parameters is established;

the binding relationship is added to the power-saving signal configuration information, the power-saving signal configuration information carrying the binding relationship is transmitted to the terminal.

Optionally, the binding relationship may include one-to-one correspondences between the BWPs and the power-saving signal parameters and/or many-to-one correspondences between the BWPs and the power-saving signal parameters.

Optionally, the power-saving signal configuration information carrying the binding relationship is transmitted to the terminal includes:

the power-saving signal configuration information is added to a first system message or a first dedicated signaling;

the first system message or the first dedicated signaling is transmitted to the terminal, to enable the terminal to obtain the power-saving signal configuration information from the first system message or the first dedicated signaling.

Optionally, the first BWP is a target BWP that the base station indicates the terminal for a BWP switching;

the power-saving signal configuration information is transmitted to the terminal may include that:

a BWP switching command carrying the power-saving signal configuration information is generated, the power-saving signal configuration information may include a target power-saving signal parameter corresponding to the target BWP or indication information for characterizing a target power-saving signal parameter corresponding to the target BWP;

the BWP switching command is transmitted to the terminal.

Optionally, the method may further include that:

a power-saving signal candidate parameter set is configured for the terminal;

the power-saving signal candidate parameter set is added to a second system message or a second dedicated signaling;

the second system message or the second dedicated signaling is transmitted to the terminal, to enable the terminal to obtain the power-saving signal candidate parameter set from the second system message or the second dedicated signaling, and the target power-saving signal parameter corresponding to the target BWP is determined according to the power-saving signal candidate parameter set and the indication information in the power-saving signal configuration information.

Optionally, the first BWP is a default BWP and/or an initial BWP for implementing a BWP auto-fallback function;

the power-saving signal configuration information is transmitted to the terminal may include that:

a third system message or a third dedicated signaling carrying the power-saving signal configuration information is generated, the power-saving signal configuration information may include a first default power-saving signal parameter corresponding to the default BWP and/or a second default power-saving signal parameter corresponding to the initial BWP;

the third system message or the third dedicated signaling is transmitted to the terminal.

Optionally, the first power-saving signal parameter corresponds to a serving cell serving the terminal, and power-saving signal parameter configurations corresponding to different serving cells are performed, respectively.

Optionally, the serving cell may include a primary cell and a secondary cell for carrier aggregation (CA) or dual connectivity (DC)

Optionally, the power-saving signal includes a wake-up signal (WUS) and/or a go-to sleep signal (GTS).

According to a second aspect of the disclosure, there is provided a method for monitoring a power-saving signal, applied to a terminal for which at least one bandwidth portion BWP is configured by a base station, the method may include that:

power-saving signal configuration information is received from a base station, the power-saving signal configuration information is configured for indicating to monitor the power-saving signal over a first BWP using the first power-saving signal parameter, the first power-saving signal parameter is a power-saving signal parameter configured for the first BWP by the base station to monitor the power-saving signal;

the power-saving signal monitoring over the first BWP is performed according to the first power-saving signal parameter based on the power-saving signal configuration information.

Optionally, the first BWP is any one of BWPs which are configured for the terminal by the base station, the power-saving signal configuration information may include a binding relationship between the BWPs which are configured for the terminal by the base station and power-saving signal parameters;

the power-saving signal monitoring over the first BWP is performed according to the first power-saving signal parameter based on the power-saving signal configuration information may include that:

whether the binding relationship includes a target power-saving signal parameter bound to a target BWP is determined in response that a switching is performed from a currently activated BWP to the target BWP;

in response that the binding relationship includes the target power-saving signal parameter bound to the target BWP, the power-saving signal monitoring over the target BWP is performed according to the target power-saving signal parameter;

in response that the binding relationship does not include the target power-saving signal parameter bound to the target BWP, an operation of monitoring the power-saving signal over the target BWP is not performed. In other words, for example, the operation of the terminal may fall back to the physical downlink control channel (PDCCH) monitoring mechanism and/or the physical downlink shared channel (PDSCH) monitoring mechanism.

Optionally, the binding relationship may include one-to-one correspondences between the BWPs and the power-saving signal parameters and/or many-to-one correspondences between the BWPs and the power saving signal parameters.

Optionally, the first BWP is a target BWP that the base station indicates the terminal for a BWP switching;

the power saving signal configuration information is received from the base station includes:

a BWP switching command carrying the power-saving signal configuration information is received from the base station, the power-saving signal configuration information includes a target power-saving signal parameter corresponding to the target BWP or indication information for characterizing a target power-saving signal parameter corresponding to the target BWP;

a first power-saving signal corresponding to the first power-saving signal parameter is monitored over the first BWP according to the power-saving signal configuration information includes:

in response that the power-saving signal configuration information includes the target power-saving signal parameter corresponding to the target BWP, the power-saving signal monitoring is performed over the target BWP according to the target power-saving signal parameter;

in response that the power-saving signal configuration information includes the indication information for characterizing the target power-saving signal parameter corresponding to the target BWP, the target power-saving signal parameter corresponding to the indication information is determined according to a power-saving signal candidate parameter set configured for the terminal by the base station and the power-saving signal configuration information, and the power-saving signal monitoring over the target BWP is performed according to the target power-saving signal parameter.

Optionally, the first BWP is a target BWP that the base station indicates the terminal for a BWP switching;

the power-saving signal configuration information is received from the base station may include that:

a BWP switching command carrying the power-saving signal configuration information is received from the base station, the power-saving signal configuration information does not includes a target power-saving signal parameter corresponding to the target BWP or indication information for characterizing a target power-saving signal parameter corresponding to the target BWP, the method may further include:

the operation of monitoring the power-saving signal over the target BWP is not performed. In other words, for example, the operation of the terminal may fall back to the PDCCH monitoring mechanism and/or the PDSCH monitoring mechanism.

Optionally, the first BWP is a default BWP and/or an initial BWP for implementing a BWP auto-fallback function;

the power-saving signal configuration information is received from the base station may include that:

a system message or a dedicated signaling carrying the power-saving signal configuration information is received from the base station, and the power-saving signal configuration information includes a first default power-saving signal parameter corresponding to the default BWP and/or a second default power-saving signal parameter corresponding to the initial BWP;

a first power-saving signal corresponding to the first power-saving signal parameter is monitored over the first BWP according to the power-saving signal configuration information may include that:

in response to falling back from a currently activated BWP to the default BWP, the power-saving signal monitoring is performed over the default BWP according to the first default power-saving signal parameter corresponding to the default BWP in response to falling back from a currently activated BWP to the initial BWP, the power-saving signal monitoring is performed over the initial BWP according to the second default power-saving signal parameter corresponding to the initial BWP.

According to a third aspect of the disclosure, there is provided a device for monitoring a power-saving signal, applied to a base station configuring at least one BWP for a terminal, the device may include:

a first configuring module, configured to configure for a first BWP a first power-saving signal parameter for monitoring the power-saving signal;

a generating module, configured to generate power-saving signal configuration information, and the power-saving signal configuration information is configured for indicating to perform a power-saving signal monitoring over the first BWP using the first power-saving signal parameter;

a first transmitting module, configured to transmit the power-saving signal configuration information to the terminal, to enable the terminal to perform the power-saving signal monitoring over the first BWP according to the first power-saving signal parameter based on the power-saving signal configuration information.

Optionally, the first power-saving signal parameter includes at least one of the following information:

a first information configured for characterizing a transmission period of the first power-saving signal;

a second information configured for characterizing a start-end time of the first power-saving signal;

a third information configured for characterizing a duration of the first power saving signal.

Optionally, the start-end time of the first power-saving signal includes a starting time of the first power-saving signal and/or an ending time of the first power-saving signal within the transmission period, and the starting time and/or the ending time is/are an offset value for a specified reference point.

Optionally, the first BWP is any one of BWPs which are configured for the terminal by the base station; the first transmitting module may include:

an establishing sub-module, configured to establish a binding relationship between the BWPs which are configured for the terminal by the base station and power-saving signal parameters;

a first adding sub-module, configured to add the binding relationship to the power-saving signal configuration information;

a first transmitting sub-module, configured to transmit the power-saving signal configuration information carrying the binding relationship to the terminal.

Optionally, the binding relationship includes one-to-one correspondences between the BWPs and the power-saving signal parameters and/or many-to-one correspondences between the BWPs and the power-saving signal parameters.

Optionally, the first transmitting sub-module may include:

a second adding sub-module, configured to add the power-saving signal configuration information to a first system message or a first dedicated signaling;

a second transmitting sub-module, configured to transmit the first system message or the first dedicated signaling to the terminal, to enable the terminal to obtain the power-saving signal configuration information from the first system message or the first dedicated signaling.

Optionally, the first BWP is a target BWP that the base station indicates the terminal for a BWP switching; the first transmitting sub-module may include:

a first generating sub-module, configured to generate a BWP switching command carrying the power-saving signal configuration information, and the power-saving signal configuration information includes a target power-saving signal parameter corresponding to the target BWP or indication information for characterizing a target power-saving signal parameter corresponding to the target BWP;

a third transmitting sub-module, configured to transmit the BWP switching command to the terminal.

Optionally, the device may further include:

a second configuring module, configured to configure a power-saving signal candidate parameter set for the terminal;

an adding module, configured to add the power-saving signal candidate parameter set to a second system message or a second dedicated signaling;

a second transmitting module, configured to transmit the second system message or the second dedicated signaling to the terminal, to enable the terminal to obtain the power-saving signal candidate parameter set from the second system message or the second dedicated signaling, and determining the target power-saving signal parameter corresponding to the target BWP according to the power-saving signal candidate parameter set and the indication information in the power-saving signal configuration information.

Optionally, the first BWP is a default BWP and/or an initial BWP for implementing a BWP auto-fallback function; the first transmitting sub-module may include:

a second generating sub-module, configured to generate a third system message or a third dedicated signaling carrying the power-saving signal configuration information, the power-saving signal configuration information includes a first default power-saving signal parameter corresponding to the default BWP and/or a second default power-saving signal parameter corresponding to the initial BWP;

a fourth transmitting sub-module, configured to transmit the third system message or the third dedicated signaling to the terminal.

Optionally, the first power-saving signal parameter corresponds to a serving cell serving the terminal, and power-saving signal parameter configurations corresponding to different serving cells are performed, respectively.

Optionally, the serving cell includes a primary cell and a secondary cell for CA or DC.

Optionally, the power-saving signal includes a WUS and/or a GTS.

According to a fourth aspect of the disclosure, there is provided a device for monitoring a power-saving signal, applied to a terminal for which at least one bandwidth portion BWP is configured by a base station, the device may include:

a receiving module, configured to receive power-saving signal configuration information from a base station, the power-saving signal configuration information is configured for indicating to monitor the power-saving signal on a first BWP using the first power-saving signal parameter, the first power-saving signal parameter is a power-saving signal parameter configured for the first BWP by the base station to monitor the power-saving signal;

a first monitoring module, configured to perform the power-saving signal monitoring over the first BWP according to the first power-saving signal parameter based on the power-saving signal configuration information.

Optionally, the first BWP is any one of BWPs which are configured for the terminal by the base station, the power-saving signal configuration information includes a binding relationship between the BWPs which are configured for the terminal by the base station and power-saving signal parameters;

Optionally, the first monitoring module may include:

a determining sub-module, configured to determine whether the binding relationship includes a target power-saving signal parameter bound to a target BWP in response that a switching is performed from a currently activated BWP to the target BWP;

a first monitoring sub-module, configured to, in response that the binding relationship includes the target power-saving signal parameter bound to the target BWP, perform the power-saving signal monitoring over the target BWP according to the target power-saving signal parameter;

a second monitoring sub-module, configured to, in response that the binding relationship not includes the target power-saving signal parameter bound to the target BWP, not perform an operation of monitoring the power-saving signal over the target BWP. In other words, for example, the second monitoring sub-module may fall back to the PDCCH monitoring mechanism and/or the PDSCH monitoring mechanism.

Optionally, the binding relationship includes one-to-one correspondences between the BWPs and the power-saving signal parameters and/or many-to-one correspondences between the BWPs and the power saving signal parameters.

Optionally, the first BWP is a target BWP that the base station indicates the terminal for a BWP switching;

the receiving module includes:

a first receiving sub-module, configured to receive a BWP switching command carrying the power-saving signal configuration information from the base station, the power-saving signal configuration information includes a target power-saving signal parameter corresponding to the target BWP or indication information for characterizing a target power-saving signal parameter corresponding to the target BWP;

the first monitoring module includes:

a third monitoring sub-module, configured to, in response that the power-saving signal configuration information includes the target power-saving signal parameter corresponding to the target BWP, perform the power-saving signal monitoring over the target BWP according to the target power-saving signal parameter;

a fourth monitoring sub-module, configured to, in response that the power-saving signal configuration information includes the indication information for characterizing the target power-saving signal parameter corresponding to the target BWP, determine the target power-saving signal parameter corresponding to the indication information according to a power-saving signal candidate parameter set configured for the terminal by the base station and the power-saving signal configuration information, and perform the power-saving signal monitoring over the target BWP according to the target power-saving signal parameter.

Optionally, the first BWP is a target BWP that the base station indicates the terminal for a BWP switching;

the receiving module includes:

a second receiving sub-module, configured to receive a BWP switching command carrying the power-saving signal configuration information from the base station, the power-saving signal configuration information does not include a target power-saving signal parameter corresponding to the target BWP or indication information for characterizing a target power-saving signal parameter corresponding to the target BWP;

the device may further include:

a second monitoring module, configured to not perform the operation of monitoring the power-saving signal over the target BWP. In other words, for example, the second monitoring module may fall back to the PDCCH monitoring mechanism and/or the PDSCH monitoring mechanism.

Optionally, the first BWP is a default BWP and/or an initial BWP for implementing a BWP auto-fallback function;

Optionally, the receiving module includes:

a third receiving sub-module, configured to receive a system message or a dedicated signaling carrying the power-saving signal configuration information from the base station, the power-saving signal configuration information includes a first default power-saving signal parameter corresponding to the default BWP and/or a second default power-saving signal parameter corresponding to the initial BWP;

the first monitoring module includes:

a fifth monitoring sub-module, configured to, in response to falling back from a currently activated BWP to the default BWP, perform the power-saving signal monitoring over the default BWP according to the first default power-saving signal parameter corresponding to the default BWP;

a sixth monitoring sub-module, configured to, in response to falling back from a currently activated BWP to the initial BWP, perform the power-saving signal monitoring over the initial BWP according to the second default power-saving signal parameter corresponding to the initial BWP.

According to a fifth aspect of the disclosure, there is provided a non-transitory computer readable storage medium having stored thereon a computer program for performing the method for monitoring a power-saving signal, which is provided in the first aspect described above.

According to a sixth aspect of the disclosure, there is provided a non-transitory computer readable storage medium having stored thereon a computer program for performing the method for monitoring a power-saving signal, which is provided in the second aspect described above.

According to a seventh aspect of the disclosure, there is provided a device for monitoring a power-saving signal, applied to a base station configuring at least one Bandwidth Portion (BWP) for a terminal, the device including:

a processor;

a memory for storing processor-executable instructions;

the processor is configured to:

for a first BWP, configure a first power-saving signal parameter for monitoring the power-saving signal;

generate power-saving signal configuration information, the power-saving signal configuration information is configured for indicating to perform a power-saving signal monitoring over the first BWP using the first power-saving signal parameter;

transmit the power-saving signal configuration information to the terminal, to enable the terminal to perform the power-saving signal monitoring over the first BWP according to the first power-saving signal parameter based on the power-saving signal configuration information.

According to an eighth aspect of the disclosure, there is provided a device for monitoring a power-saving signal, applied to a terminal for which at least one bandwidth portion BWP is configured by a base station, the device including:

a processor;

a memory for storing processor-executable instructions;

the processor is configured to:

receive power-saving signal configuration information from a base station, the power-saving signal configuration information is configured for indicating to monitor the power-saving signal over a first BWP using the first power-saving signal parameter, the first power-saving signal parameter is a power-saving signal parameter configured for the first BWP by the base station to monitor the power-saving signal;

perform the power-saving signal monitoring over the first BWP according to the first power-saving signal parameter based on the power-saving signal configuration information.

The technical solution provided by the embodiments of the present disclosure may include the following advantages:

The base station in the present disclosure can configure for a first BWP a first power-saving signal parameter for monitoring the power-saving signal; generate power-saving signal configuration information, the power-saving signal configuration information is configured for indicating to perform a power-saving signal monitoring over the first BWP using the first power-saving signal parameter; and transmit the power-saving signal configuration information to the terminal, to enable the terminal to perform the power-saving signal monitoring over the first BWP according to the first power-saving signal parameter based on the power-saving signal configuration information, so that dynamic configuration for power-saving signal parameters for monitoring power-saving signals on each BWP can be realized, a flexibility of power-saving signal parameter configuration can be improved, and power consumption for monitoring power-saving signal can be reduced.

The terminal in the present disclosure can receive power-saving signal configuration information from a base station, the power-saving signal configuration information is configured for indicating to monitor the power-saving signal over a first BWP using the first power-saving signal parameter, and the first power-saving signal parameter is a power-saving signal parameter configured for the first BWP by the base station to monitor the power-saving signal; and perform the power-saving signal monitoring over the first BWP according to the first power-saving signal parameter based on the power-saving signal configuration information, so that dynamic configuration for power-saving signal parameters for monitoring a power-saving signal on each BWP can be realized, flexibility of power-saving signal parameter configuration can be improved, and power consumption for monitoring power-saving signal can be reduced.

It is to be understood that both the foregoing general description and the following detailed description are exemplary and explanatory only and cannot limit the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

The terminology used in the present disclosure is for the purpose of describing particular embodiments only and is not intended to limit the present disclosure. As used in the disclosure and the appended claims, the singular forms "a" "said" and "the" are also intended to include the plural forms unless the context clearly indicates otherwise. It is also to be understood that the term "and/or" used herein, refers to and encompasses any or all possible combinations of one or more associated listed items.

It is to be understood that while the terms first, second, third, etc., may be used in the present disclosure to describe various information, such information should not be limited to such terms. These terms are only used to distinguish the same type of information from one another. For example, the first information may also be referred to as second information without departing from the scope of the present disclosure, and similarly, the second information may also be referred to as first information. Depending on the context, the term "if" used herein may be interpreted as "in the case that" or "when" or "in response to determining".

Figure 1:
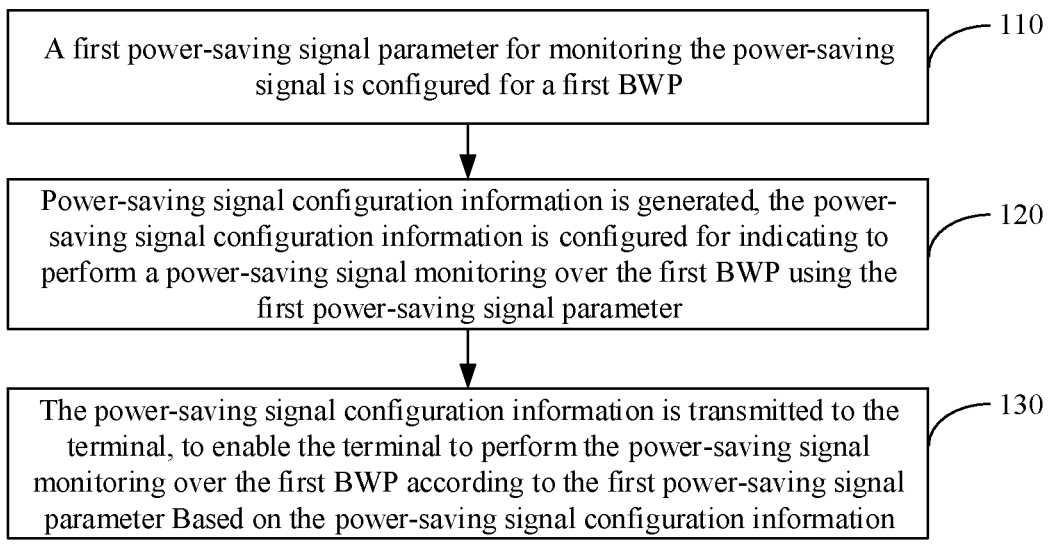
FIG. 1 is a flowchart of a method for monitoring a power-saving signal according to an embodiment of the disclosure.
Figure 2:
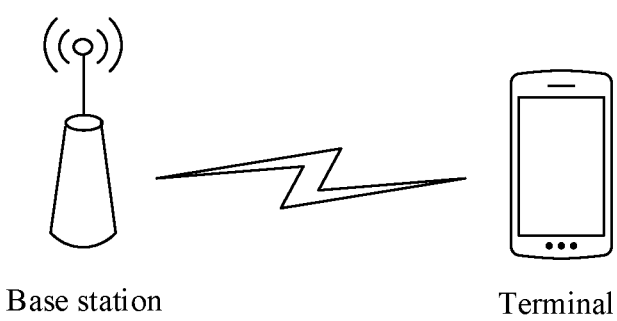
FIG. 2 is an application scenario of a method for monitoring a power-saving signal according to an embodiment of the disclosure.

FIG. 1 is a flowchart of a method for monitoring a power-saving signal according to an embodiment of the disclosure, FIG. 2 is an application scenario of a method for monitoring a power-saving signal according to an embodiment of the application. The method for monitoring a power-saving signal can be applied to a base station configuring at least one BWP for a terminal. As shown in FIG. 1, the method for monitoring a power-saving signal includes the following operations 110-130.

In operation 110, a first power-saving signal parameter for monitoring the power-saving signal is configured for a first BWP.

In the embodiment of the present disclosure, to achieve the purpose of power saving, the base station may dynamically configure for a terminal power-saving signal parameters for monitoring a power-saving signal on each BWP.

In an embodiment, the first power-saving signal parameter in the operation 110 may include at least one of the following information.

(1-1) a first information configured for characterizing a transmission period of the power-saving signal;

(1-2) a second information configured for characterizing a start-end time of the power-saving signal;

(1-3) a third information configured for characterizing a duration of the power saving signal.

In an embodiment, the start-end time of the power-saving signal described in (1-2) above includes a starting time of the power-saving signal and/or the ending time of the power-saving signal within the transmission period, the starting time and/or the ending time is/are an offset value for a specified reference point. The specified reference point may be the start point of the transmission period. In addition, the offset value for the specified reference point may be a specified number of OFDM (Orthogonal Frequency Division Multiplexing, OFDM) symbols. For example, the offset value is 3 OFDM symbols.

In an embodiment, the power-saving signal for monitoring in the operation 110 may be a WUS and/or a GTS.

The WUS and GTS are signals introduced in a NewRadio (NR) next generation communication system. The WUS is a low-power detection signal. When the terminal detects the WUS, it means that it will continue to monitor the PDCCH, otherwise, it is not necessary to monitor to the subsequent PDCCH. In addition, GTS means allowing the terminal entering the dormant state quickly, that is, the terminal enters the dormant state instead of performing monitoring.

In an embodiment, the first BWP is any one of BWPs which are configured for the terminal by the base station in the operation 110.

In an embodiment, the first BWP is a target BWP that the base station indicates the terminal for a BWP switching in the operation 110.

In an embodiment, the first BWP is a default BWP and/or an initial BWP for implementing a BWP auto-fallback function in the operation 110. The function of automatically falling back to the default BWP or the initial BWP is specifically as follows: if the currently activated BWP is in an inactive state within a time period, the terminal automatically falls back from the currently activated BWP to the default BWP after the BWP inactive timer expires. If the default BWP is not configured, the terminal automatically falls back to the initial BWP. The initial BWP is a BWP configured for the terminal by the base station through the system message, and the default BWP is a small BWP specifically set for the terminal by the base station based on the power saving consideration. In this way, the PDCCH monitoring and/or PDSCH monitoring can be performed on the small BWP, thereby achieving the purpose of power saving.

In an embodiment, the first power-saving signal parameter in the operation 110 corresponds to a serving cell serving the terminal, and power-saving signal parameter configurations corresponding to different serving cells are performed, respectively. In an embodiment, the serving cell includes a primary cell and a secondary cell for CA or DC.

In operation 120, power-saving signal configuration information is generated, the power-saving signal configuration information is configured for indicating to perform a power-saving signal monitoring over the first BWP using the first power-saving signal parameter.

In operation 130, the power-saving signal configuration information is transmitted to the terminal, to enable the terminal to perform the power-saving signal monitoring over the first BWP according to the first power-saving signal parameter based on the power-saving signal configuration information.

In an example scenario, as shown in FIG. 2, the example scenario includes base station and terminal. The base station may configure for a first BWP a first power-saving signal parameter for monitoring the power-saving signal; generate the power-saving signal configuration information, the power-saving signal configuration information is configured for indicating to perform a power-saving signal monitoring over the first BWP using the first power-saving signal parameter; and transmit the power-saving signal configuration information to the terminal, to enable the terminal to perform the power-saving signal monitoring over the first BWP according to the first power-saving signal parameter based on the power-saving signal configuration information.

As can be seen from above embodiments, a first power-saving signal parameter for monitoring the power-saving signal is configured for the first BWP; the power-saving signal configuration information is generated; the power-saving signal configuration information is configured for indicating to perform a power-saving signal monitoring over the first BWP using the first power-saving signal parameter; and the power-saving signal configuration information is transmitted to the terminal, to enable the terminal to perform the power-saving signal monitoring over the first BWP according to the first power-saving signal parameter based on the power-saving signal configuration information. Therefore, dynamic configuration for power-saving signal parameters for monitoring a power-saving signal on each BWP is realized, flexibility of power-saving signal parameter configuration is improved, and power consumption for monitoring power-saving signal is reduced.

Figure 3:
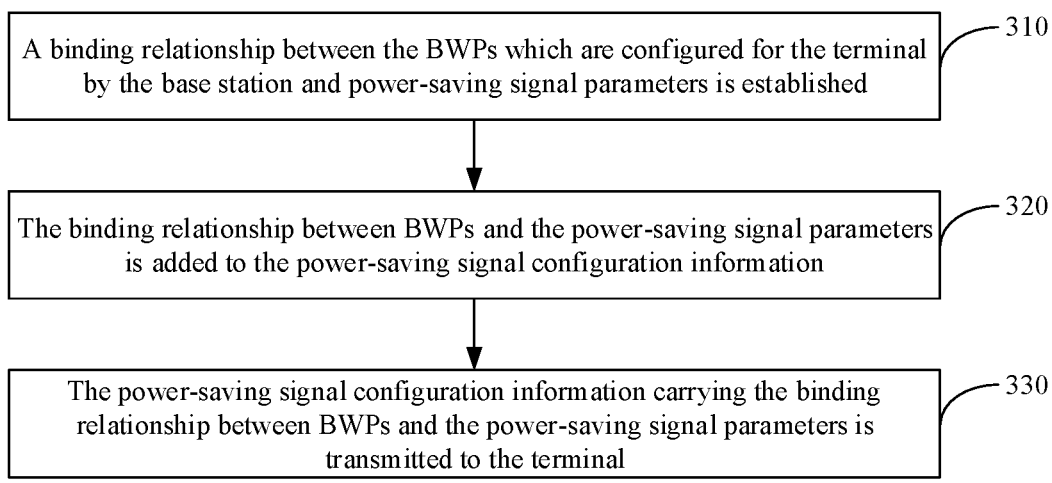
FIG. 3 is another flowchart of a method for monitoring a power-saving signal according to an embodiment of the disclosure.

FIG. 3 is another flowchart of a method for monitoring a power-saving signal according to an embodiment of the present disclosure, the method for monitoring a power-saving signal can applied to a base station and based on the method shown in FIG. 1, the first BWP is any one of BWPs which are configured for the terminal by the base station. As shown in FIG. 3, during performing the operation 130, the following operations 310-330 may be included.

In operation 310, a binding relationship between the BWPs which are configured for the terminal by the base station and power-saving signal parameters is established.

In the embodiment of the present disclosure, when a base station configures corresponding power-saving signal parameters for BWPs, a binding relationship between BWPs and the power-saving signal parameters can be established, and the binding relationship is notified to the terminal through the power-saving signal configuration information, so that the terminal can quickly obtain the binding relationship between BWPs and the power-saving signal parameters from the received power-saving signal configuration information.

In an embodiment, the binding relationship in the operation 310 includes one-to-one correspondences between the BWPs and the power-saving signal parameters and/or many-to-one correspondences between the BWPs and the power-saving signal parameters.

For example, BWP1 is bound to the power-saving signal parameter 1, BWP2 is bound to the power-saving signal parameter 2, and BWP3 is bound to the power-saving signal parameter 3.

For another example, the BWPs bound to the power-saving signal parameter 1 includes: BWP1, BWP2, and BWP3.

For another example, the BWP bound to the power-saving signal parameter 1 is BWP1; and the BWPs bound to the power-saving signal parameter 2 include: BWP1, BWP2, and BWP3.

In operation 320, the binding relationship between BWPs and the power-saving signal parameters is added to the power-saving signal configuration information.

In operation 330, the power-saving signal configuration information carrying the binding relationship between BWPs and the power-saving signal parameters is transmitted to the terminal.

As can be seen from the above embodiments, a binding relationship between the BWPs which are configured for the terminal by the base station and power-saving signal parameters is established, the binding relationship between BWPs and the power-saving signal parameters is added to the power-saving signal configuration information, and the power-saving signal configuration information carrying the binding relationship between BWPs and the power-saving signal parameters is transmitted to the terminal. Therefore, when the terminal is switched from the currently activated BWP to the target BWP, the target power-saving signal parameter corresponding to the target BWP can be determined according to the binding relationship, and power-saving signal monitoring over the target BWP is performed according to the target power saving signal parameter, thereby improving the accuracy of power saving signal monitoring.

Figure 4:
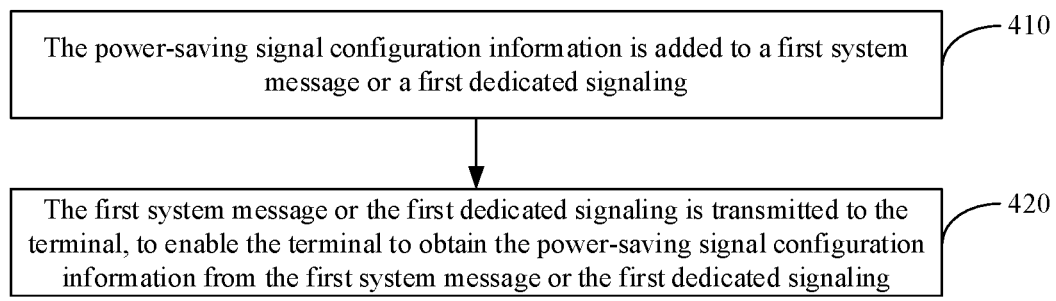
FIG. 4 is another flowchart of a method for monitoring a power-saving signal according to an embodiment of the disclosure.

FIG. 4 is another flowchart of a method for monitoring a power-saving signal according to an embodiment of the present disclosure, the method for monitoring a power-saving signal can applied to a base station, and based on the method shown in FIG. 3, As shown in FIG. 4, during performing the operation 330, the following operations 410-420 may be included:

In operation 410, the power-saving signal configuration information is added to a first system message or a first dedicated signaling.

In operation 420, the first system message or the first dedicated signaling is transmitted to the terminal, to enable the terminal to obtain the power-saving signal configuration information from the first system message or the first dedicated signaling.

As can be seen from the above embodiment, the power-saving signal configuration information can be notified to the terminal through the first system message or the first dedicated signaling, thereby improving the reliability of the transmission of the power-saving signal configuration information.

Figure 5:
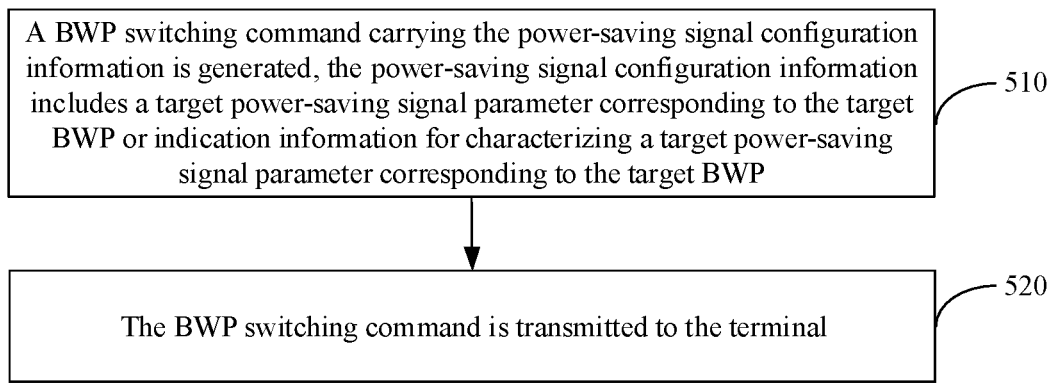
FIG. 5 is another flowchart of a method for monitoring a power-saving signal according to an embodiment of the disclosure.

FIG. 5 is another flowchart of a method for monitoring a power-saving signal according to an embodiment of the disclosure, the method for monitoring a power-saving signal can applied to a base station and based on the method shown in FIG. 1, the first BWP is a target BWP that the base station indicates the terminal for a BWP switching. As shown in FIG. 5, during performing the operation 130, the following operations 510-520 may be included.

In operation 510, a BWP switching command carrying the power-saving signal configuration information is generated, the power-saving signal configuration information includes a target power-saving signal parameter corresponding to the target BWP or indication information for characterizing a target power-saving signal parameter corresponding to the target BWP.

In the embodiment of the present disclosure, the BWP switching command is a command issued when the base station needs to notify the terminal of BWP switching. If the BWP switching command includes the target power-saving signal parameter corresponding to the target BWP, the terminal performs the power-saving signal monitoring over the target BWP according to the corresponding target power-saving signal parameter when the switching is performed to the target BWP.

In operation 520, the BWP switching command is transmitted to the terminal.

As can be seen from the above embodiment, a BWP switching command carrying the power-saving signal configuration information is generated, the power-saving signal configuration information includes a target power-saving signal parameter corresponding to the target BWP or indication information for characterizing a target power-saving signal parameter corresponding to the target BWP; and the BWP switching command is transmitted to the terminal. Therefore, the terminal can perform the power-saving signal monitoring over the target BWP according to the corresponding target power-saving signal parameter when the switching is performed from the currently activated BWP to the target BWP. Thus, adjustment of the power-saving signal parameters for the BWP switching is realized, and efficiency of the power-saving signal monitoring is further improved.

Figure 6:
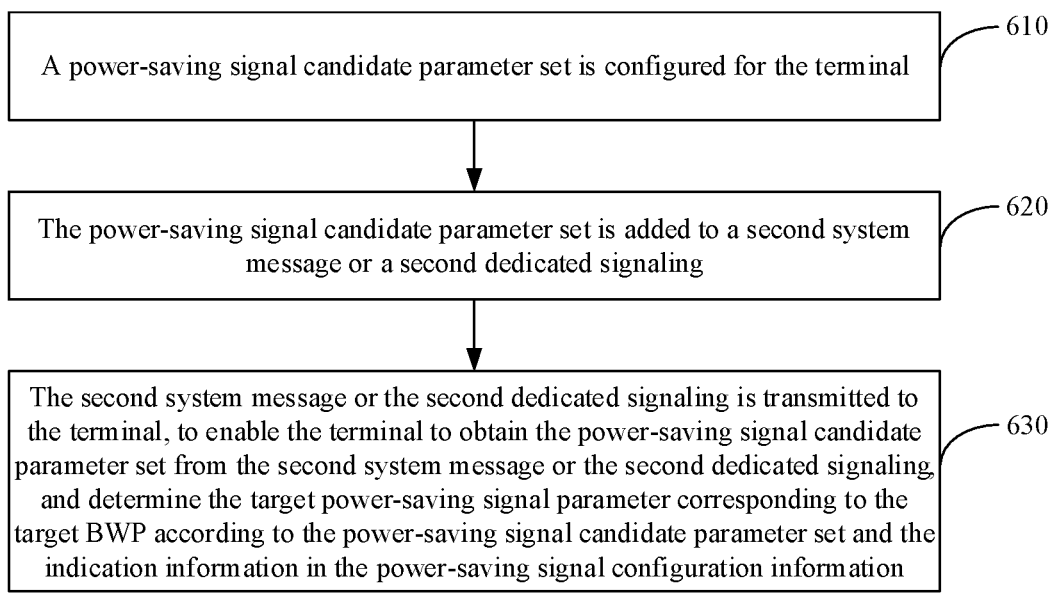
FIG. 6 is another flowchart of a method for monitoring a power-saving signal according to an embodiment of the disclosure.

FIG. 6 is another flowchart of a method for monitoring a power-saving signal according to an embodiment of the disclosure, the method for monitoring a power-saving signal can applied to a base station and based on the method shown in FIG. 5. As shown in FIG. 6, the method for monitoring a power-saving signal may further include the following operations 610-630.

In operation 610, a power-saving signal candidate parameter set is configured for the terminal.

In the embodiment of the present disclosure, the base station configures the power-saving signal candidate parameter set in advance according to the actual situation and notifies the terminal. In this way, the terminal obtains the power-saving signal parameters from the power-saving signal candidate parameter set. For example, the power-saving signal configuration information includes the indication information for characterizing a target power-saving signal parameter corresponding to the target BWP (for example, the indication information is the second), so that the terminal can obtain the corresponding target power-saving signal parameters (for example, the terminal can obtain the second candidate power-saving signal parameter in the power-saving signal candidate parameter set as the target power-saving signal parameter) from the power-saving signal candidate parameter set according to the indication information.

In operation 620, the power-saving signal candidate parameter set is added to a second system message or a second dedicated signaling.

In operation 630, the second system message or the second dedicated signaling is transmitted to the terminal, to enable the terminal to obtain the power-saving signal candidate parameter set from the second system message or the second dedicated signaling, and determine the target power-saving signal parameter corresponding to the target BWP according to the power-saving signal candidate parameter set and the indication information in the power-saving signal configuration information.

As can be seen from the above embodiment, a power-saving signal candidate parameter set is configured for the terminal, and the power-saving signal candidate parameter set is notified to the terminal through the second system message or the second dedicated signaling. In this way, the terminal can accurately obtain the power-saving signal parameters from the power-saving signal candidate parameter set when determining the power-saving signal parameters corresponding to the indication information in the power-saving signal configuration information, thereby improving the reliability of determining the power-saving signal parameter.

Figure 7:
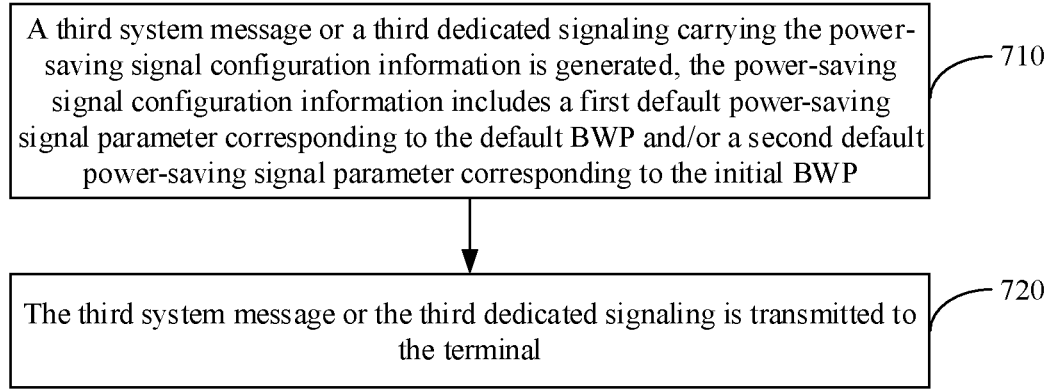
FIG. 7 is another flowchart of a method for monitoring a power-saving signal according to an embodiment of the disclosure.

FIG. 7 is another flowchart of a method for monitoring a power-saving signal according to an embodiment of the disclosure, the method for monitoring a power-saving signal can applied to a base station and based on the method shown in FIG. 1, the first BWP is a default BWP and/or an initial BWP for implementing a BWP auto-fallback function. As shown in FIG. 7, during performing the operation 130, the following operations 710-720 may be included.

In operation 710, a third system message or a third dedicated signaling carrying the power-saving signal configuration information is generated, the power-saving signal configuration information includes a first default power-saving signal parameter corresponding to the default BWP and/or a second default power-saving signal parameter corresponding to the initial BWP.

In operation 720, the third system message or the third dedicated signaling is transmitted to the terminal.

As can be seen from the above embodiment, a third system message or a third dedicated signaling carrying the power-saving signal configuration information is generated, the power-saving signal configuration information includes a first default power-saving signal parameter corresponding to the default BWP and/or a second default power-saving signal parameter corresponding to the initial BWP, and the third system message or the third dedicated signaling is transmitted to the terminal. So that the terminal can use the corresponding power-saving signal parameter over the default BWP and/or an initial BWP when the terminal is switched from the currently activated BWP to the default BWP and/or an initial BWP, therefore, adjustment of the power-saving signal parameter for implementing the BWP automatic back-off function is realized, the application range of adjustment of the power saving signal parameter is further extended, and flexibility of the power-saving signal monitoring is improved.

Figure 8:
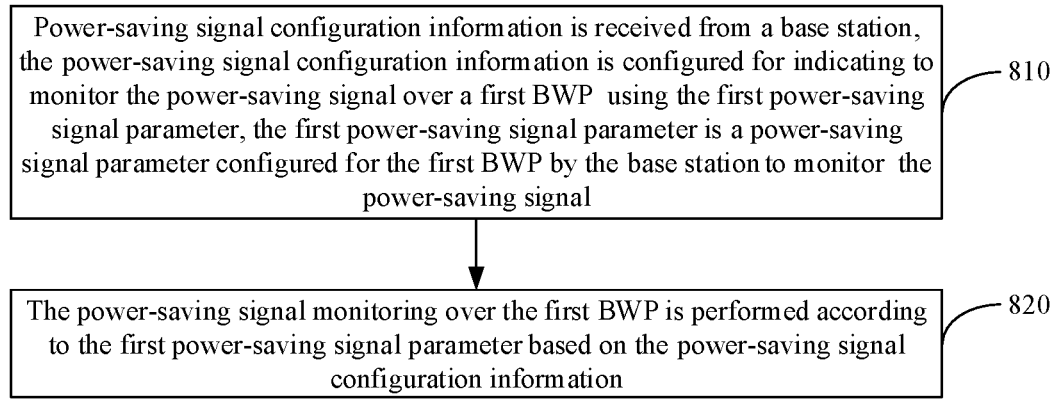
FIG. 8 is a flowchart of a method for monitoring a power-saving signal according to an embodiment of the disclosure.

FIG. 8 is another flowchart of a method for monitoring a power-saving signal according to an embodiment of the disclosure, the method for monitoring a power-saving signal can applied to terminal for which at least one bandwidth portion BWP is configured by a base station. As shown in FIG. 8, the method for monitoring a power-saving signal includes the following operations 810-820.

In operation 810, power-saving signal configuration information is received from a base station, the power-saving signal configuration information is configured for indicating to monitor the power-saving signal over a first BWP using the first power-saving signal parameter, and the first power-saving signal parameter is a power-saving signal parameter configured for the first BWP by the base station to monitor the power-saving signal.

In operation 820, the power-saving signal monitoring over the first BWP is performed according to the first power-saving signal parameter based on the power-saving signal configuration information.

In the embodiment of the present disclosure, to achieve the purpose of power saving, the base station may dynamically configure for a terminal power-saving signal parameters for monitoring a power-saving signal on each BWP.

In an embodiment, the first BWP is any one of BWPs which are configured for the terminal by the base station, the power-saving signal configuration information includes a binding relationship between the BWPs which are configured for the terminal by the base station and power-saving signal parameters; when performing the operation 820, the following implementation can be adopt:

(2-1) whether the binding relationship includes a target power-saving signal parameter bound to a target BWP is determined in response that a switching is performed from a currently activated BWP to the target BWP (2-2) in response that the binding relationship includes the target power-saving signal parameter bound to the target BWP, the power-saving signal monitoring over the target BWP is performed according to the target power-saving signal parameter;

(2-3) in response that the binding relationship does not include the target power-saving signal parameter bound to the target BWP, an operation of monitoring the power-saving signal over the target BWP is not performed. In other words, for example, the operation of the terminal may fall back to the PDCCH monitoring mechanism and/or the PDSCH monitoring mechanism.

The above-mentioned (2-2) refers to a case that the target BWP is bound to the target power-saving signal parameter, so that the terminal can first monitor the power-saving signal, and then decode the PDCCH and/or the PDSCH when it is detected that the power-saving signal has scheduling about the terminal, thereby achieving the purpose of power saving.

The above-mentioned (2-3) refers to a case that the target BWP is not bound to the target power-saving signal parameter, the terminal needs to perform PDCCH monitoring and/or PDSCH monitoring on each sub-frame at this time.

In an embodiment, the binding relationship in the implementation mentioned above includes one-to-one correspondences between the BWPs and the power-saving signal parameters and/or many-to-one correspondences between the BWPs and the power saving signal parameters.

As can be seen from the above embodiment, power-saving signal configuration information is received from a base station, the power-saving signal configuration information is configured for indicating to monitor the power-saving signal over a first BWP using the first power-saving signal parameter, the first power-saving signal parameter is a power-saving signal parameter configured for the first BWP by the base station to monitor the power-saving signal, and the power-saving signal monitoring over the first BWP is performed according to the first power-saving signal parameter based on the power-saving signal configuration information, therefore, dynamic configuration of the power-saving signal parameter for monitoring the power-saving signal on each BWP is realized, flexibility of power saving signal parameter configuration is improved, and power consumption for monitoring power-saving signal is reduced.

Figure 9:
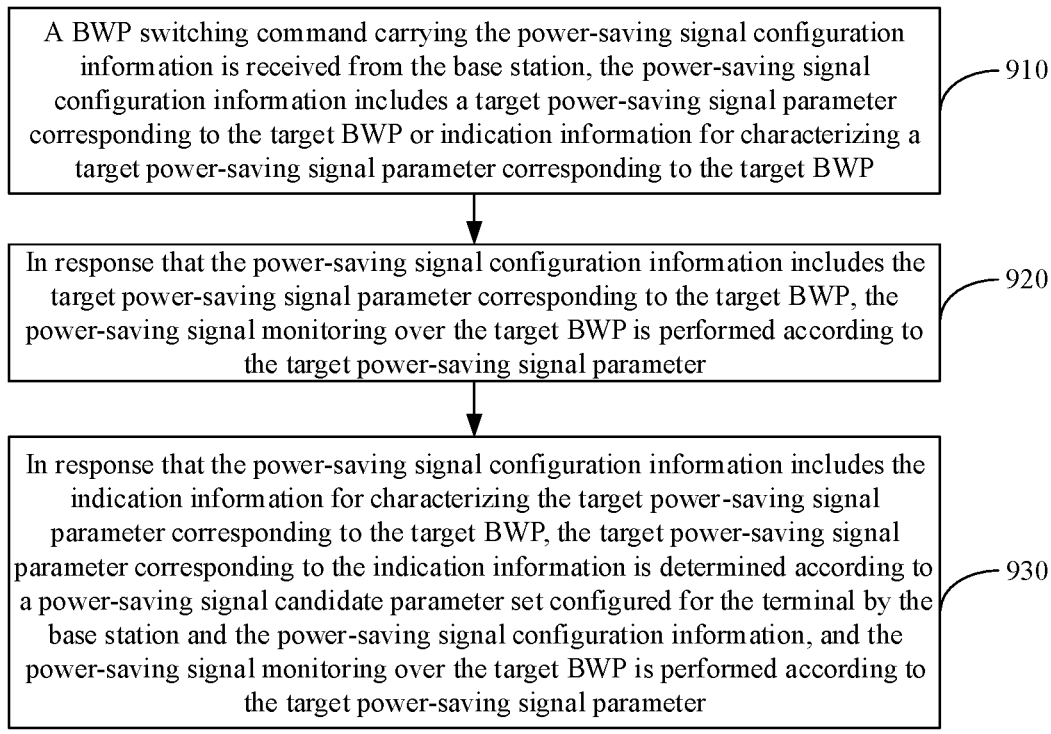
FIG. 9 is another flowchart of a method for monitoring a power-saving signal according to an embodiment of the disclosure.

FIG. 9 is another flowchart of a method for monitoring a power-saving signal according to an embodiment of the disclosure, applied to a terminal, and based on the method shown in FIG. 8, the first BWP is a target BWP that the base station indicates the terminal for a BWP switching. As shown in FIG. 9, during performing the operation 810, the following operation 910 may be included:

In operation 910, a BWP switching command carrying the power-saving signal configuration information is received from the base station, the power-saving signal configuration information includes a target power-saving signal parameter corresponding to the target BWP or indication information for characterizing a target power-saving signal parameter corresponding to the target BWP.

Accordingly, as shown in FIG. 9, during performing the operation 820, the following operations 920-930 may be included:

In operation 920, in response that the power-saving signal configuration information includes the target power-saving signal parameter corresponding to the target BWP, the power-saving signal monitoring over the target BWP is performed according to the target power-saving signal parameter.

In operation 930, in response that the power-saving signal configuration information includes the indication information for characterizing the target power-saving signal parameter corresponding to the target BWP, the target power-saving signal parameter corresponding to the indication information is determined according to a power-saving signal candidate parameter set configured for the terminal by the base station and the power-saving signal configuration information, and the power-saving signal monitoring over the target BWP is performed according to the target power-saving signal parameter.

In addition, in an embodiment, in the operation 910, if the BWP switching command carrying the power-saving signal configuration information received from the base station does not include a target power-saving signal parameter corresponding to the target BWP or indication information for characterizing a target power-saving signal parameter corresponding to the target BWP, the following implementation can be further adopted.

(3-1) the operation of monitoring the power-saving signal over the target BWP is not performed, and it is full back to the PDCCH monitoring mechanism and/or the PDSCH monitoring mechanism.

In this manner, regardless of whether or not the binding relationship between the BWPs and the power-saving signal parameters include the target power-saving signal parameter corresponding to the target BWP, as long as the BWP switching command does not include the target power-saving signal parameter corresponding to the target BWP or the indication information for characterizing the target power-saving signal parameter corresponding to the target BWP, the operation of monitoring the power-saving signal over the target BWP is not performed. In other words, for example, the operation of the terminal may fall back to the PDCCH monitoring mechanism and/or the PDSCH monitoring mechanism.

As can be seen from the above embodiment, a BWP switching command carrying the power-saving signal configuration information is received from the base station, the power-saving signal configuration information includes a target power-saving signal parameter corresponding to the target BWP or indication information for characterizing a target power-saving signal parameter corresponding to the target BWP, in response that the power-saving signal configuration information includes the target power-saving signal parameter corresponding to the target BWP, the power-saving signal monitoring over the target BWP is performed according to the target power-saving signal parameter; in response that the power-saving signal configuration information includes the indication information for characterizing the target power-saving signal parameter corresponding to the target BWP, the target power-saving signal parameter corresponding to the indication information is determined according to a power-saving signal candidate parameter set configured for the terminal by the base station and the power-saving signal configuration information, and the power-saving signal monitoring over the target BWP is performed according to the target power-saving signal parameter, therefore, adjustment of the power-saving signal parameter for BWP switching is realized, and efficiency of the power-saving signal monitoring is further improved.

Figure 10:
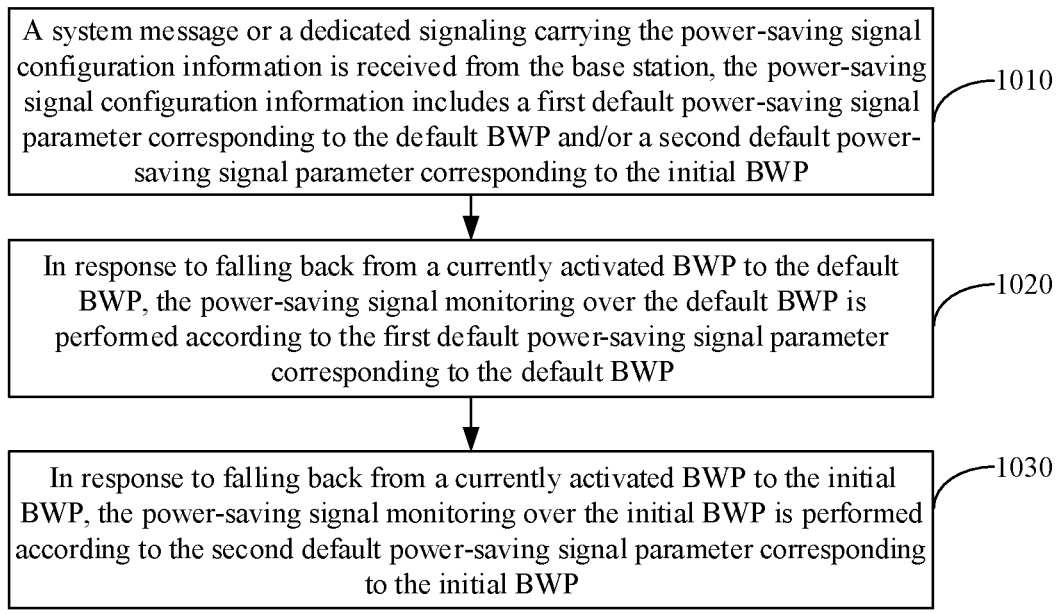
FIG. 10 is another flowchart of a method for monitoring a power-saving signal according to an embodiment of the disclosure.

FIG. 10 is another flowchart of a method for monitoring a power-saving signal according to an embodiment of the disclosure, applied to a terminal, and based on the method shown in FIG. 8, the first BWP is a default BWP and/or an initial BWP for implementing a BWP auto-fallback function. As shown in FIG. 9, during performing the operation 810, the operation 1010 may be included:

In operation 1010, a system message or a dedicated signaling carrying the power-saving signal configuration information is received from the base station, the power-saving signal configuration information includes a first default power-saving signal parameter corresponding to the default BWP and/or a second default power-saving signal parameter corresponding to the initial BWP.

Accordingly, as shown in FIG. 10, during performing the operation 820, the following operations 1020-1030 may be included:

In operation 1020, in response to falling back from a currently activated BWP to the default BWP, the power-saving signal monitoring over the default BWP is performed according to the first default power-saving signal parameter corresponding to the default BWP.

In operation 1030, in response to falling back from a currently activated BWP to the initial BWP, the power-saving signal monitoring over the initial BWP is performed according to the second default power-saving signal parameter corresponding to the initial BWP.

As can be seen from the above embodiment, a system message or a dedicated signaling carrying the power-saving signal configuration information is received from the base station, the power-saving signal configuration information includes a first default power-saving signal parameter corresponding to the default BWP and/or a second default power-saving signal parameter corresponding to the initial BWP, in response to falling back from a currently activated BWP to the default BWP, the power-saving signal monitoring over the default BWP is performed according to the first default power-saving signal parameter corresponding to the default BWP; in response to falling back from a currently activated BWP to the initial BWP, the power-saving signal monitoring over the initial BWP is performed according to the second default power-saving signal parameter corresponding to the initial BWP. Therefore, adjustment of the power-saving signal parameter for implementing the auto-fallback function of the BWP is realized, the application range of the power-saving signal parameter configuration of the BWP is further extended, and flexibility of monitoring the power-saving signal is improved.

Corresponding to the embodiments of the method for monitoring a power-saving signal, the present disclosure also provides embodiments of device for monitoring a power-saving signal. Furthermore, a part not described in detail in the embodiments of the device for monitoring power-saving signal may refer to the embodiments of the corresponding method for monitoring power-saving signal.

Figure 11:
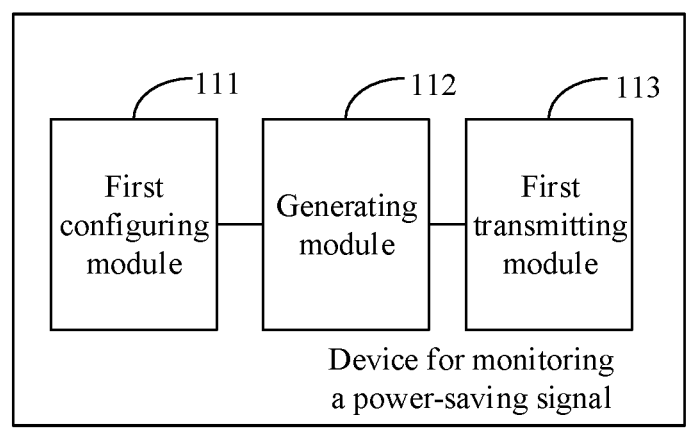
FIG. 11 is a block diagram of a device for monitoring a power-saving signal according to an embodiment of the disclosure.

FIG. 11 is a block diagram of a device for monitoring a power-saving signal according to an embodiment of the disclosure, applied to a base station configuring at least one Bandwidth Portion (BWP) for a terminal, the device including:

a first configuring module 111, configured to configure for a first BWP a first power-saving signal parameter for monitoring the power-saving signal;

a generating module 112, configured to generate power-saving signal configuration information, the power-saving signal configuration information is configured for indicating to perform a power-saving signal monitoring over the first BWP using the first power-saving signal parameter;

a first transmitting module 113, configured to transmit the power-saving signal configuration information to the terminal, to enable the terminal to perform the power-saving signal monitoring over the first BWP according to the first power-saving signal parameter based on the power-saving signal configuration information.

As can be seen from the above embodiment, by configuring for a first BWP a first power-saving signal parameter for monitoring the power-saving signal; generating power-saving signal configuration information, the power-saving signal configuration information is configured for indicating to perform a power-saving signal monitoring over the first BWP using the first power-saving signal parameter, and transmitting the power-saving signal configuration information to the terminal, the terminal can perform the power-saving signal monitoring over the first BWP according to the first power-saving signal parameter based on the power-saving signal configuration information. Therefore, dynamic configuration of power-saving signal parameters for monitoring power-saving signals on each BWP is realized, flexibility of power-saving signal parameter configuration is improved, and power consumption for monitoring power-saving signal is reduced.

In an embodiment, based on the device shown in FIG. 11, the first power-saving signal parameter includes at least one of the following information:

a first information configured for characterizing a transmission period of the first power-saving signal;

a second information configured for characterizing a start-end time of the first power-saving signal; or a third information configured for characterizing a duration of the first power saving signal.

In an embodiment, the start-end time of the first power-saving signal includes a starting time of the first power-saving signal and/or an ending time of the first power-saving signal within the transmission period, the starting time and/or the ending time is/are an offset value for a specified reference point.

Figure 12:
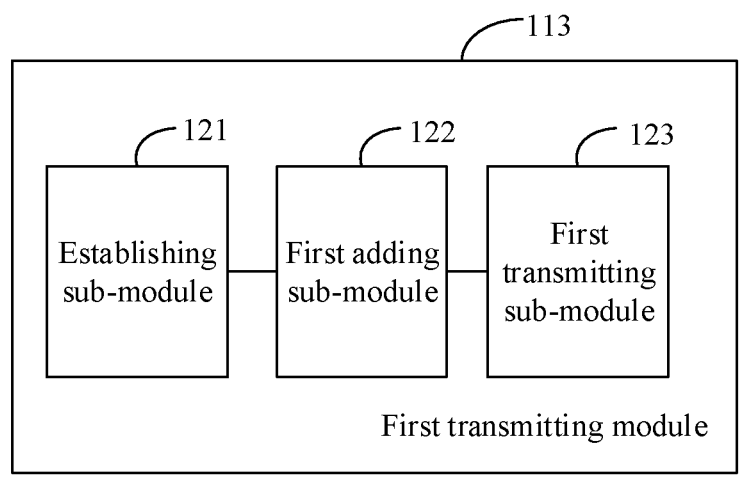
FIG. 12 is another block diagram of a device for monitoring a power-saving signal according to an embodiment of the disclosure.
Figure 13:
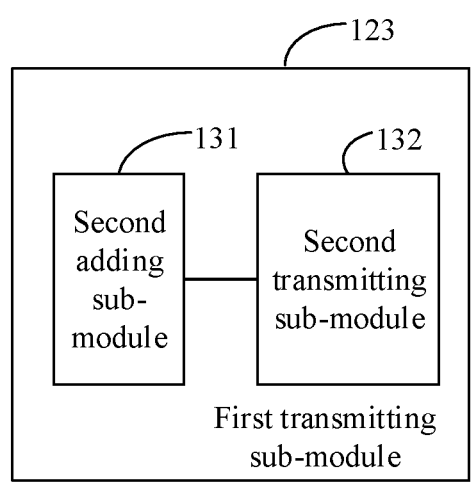
FIG. 13 is another block diagram of a device for monitoring a power-saving signal according to an embodiment of the disclosure.

In an embodiment, based on the device shown in FIG. 11, as shown in FIG. 12, the first BWP is any one of BWPs which are configured for the terminal by the base station; the first transmitting module 113 may include:

an establishing sub-module 121, configured to establish a binding relationship between the BWPs which are configured for the terminal by the base station and power-saving signal parameters;

a first adding sub-module 122, configured to adding the binding relationship to the power-saving signal configuration information;

a first transmitting sub-module 123, configured to transmit the power-saving signal configuration information carrying the binding relationship to the terminal;

As can be seen from the above embodiment, a binding relationship between the BWPs which are configured for the terminal by the base station and power-saving signal parameters can be established, the binding relationship between BWPs and the power-saving signal parameters is added to the power-saving signal configuration information, and the power-saving signal configuration information carrying the binding relationship between BWPs and the power-saving signal parameters is transmitted to the terminal. In this way, when a switching is performed from the currently activated BWP to the target BWP, the terminal can determine the target power-saving signal parameter corresponding to the target BWP according to the binding relationship, and perform the power-saving signal monitoring over the target BWP according to the target power saving signal parameter, thereby improving the accuracy of power saving signal monitoring.

In an embodiment, based on the device shown in FIG. 12, the binding relationship includes one-to-one correspondences between the BWPs and the power-saving signal parameters and/or many-to-one correspondences between the BWPs and the power-saving signal parameters.

In an embodiment, based on the device shown in FIG. 12, the first transmitting sub-module 123 may including:

a second adding sub-module 131, configured to add the power-saving signal configuration information to a first system message or a first dedicated signaling;

a second transmitting sub-module 132, configured to transmit the first system message or the first dedicated signaling to the terminal, to enable the terminal to obtain the power-saving signal configuration information from the first system message or the first dedicated signaling.

As can be seen from the above embodiment, the power-saving signal configuration information can be notified to the terminal through the first system message or the first dedicated signaling, thereby improving the reliability of the transmission of the power-saving signal configuration information.

Figure 14:
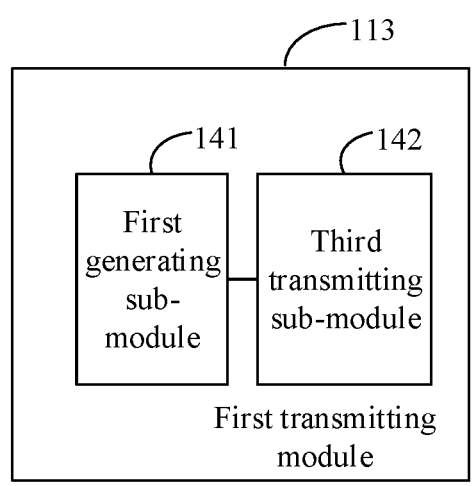
FIG. 14 is another block diagram of a device for monitoring a power-saving signal according to an embodiment of the disclosure.

In an embodiment, based on the device shown in FIG. 11, as shown in FIG. 14, the first BWP is a target BWP that the base station indicates the terminal for a BWP switching; the first transmitting sub-module 113 includes:

a first generating sub-module 141, configured to generate a BWP switching command carrying the power-saving signal configuration information, the power-saving signal configuration information includes a target power-saving signal parameter corresponding to the target BWP or indication information for characterizing a target power-saving signal parameter corresponding to the target BWP;

a third transmitting sub-module 142, configured to transmit the BWP switching command to the terminal.

As can be seen from the above embodiment, a BWP switching command carrying the power-saving signal configuration information can be generated, the power-saving signal configuration information includes a target power-saving signal parameter corresponding to the target BWP or indication information for characterizing a target power-saving signal parameter corresponding to the target BWP; and the BWP switching command is transmitted to the terminal. So that when the switching is performed from the currently activated BWP to the target BWP, the terminal can perform the power-saving signal monitoring over the target BWP according to the corresponding target power-saving signal parameter. Therefore, adjustment of the power-saving signal parameters for the BWP switching is realized, and efficiency of the power-saving signal monitoring is further improved.

Figure 15:
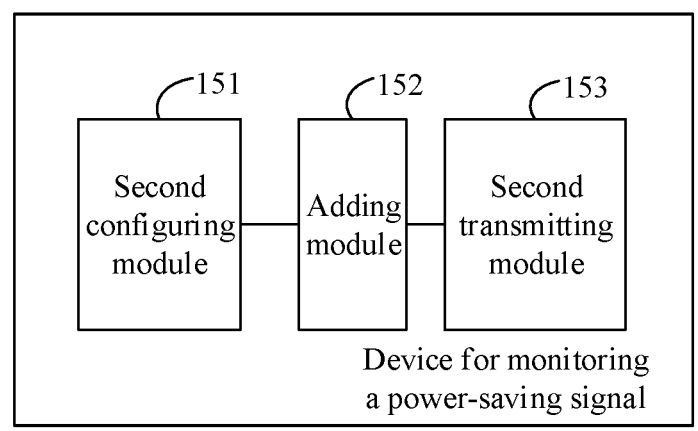
FIG. 15 is another block diagram of a device for monitoring a power-saving signal according to an embodiment of the disclosure.

In an embodiment, based on the device shown in FIG. 14, as shown in FIG. 15, the device may further include:

a second configuring module 151, configured to configure a power-saving signal candidate parameter set for the terminal;

an adding module 152, configured to add the power-saving signal candidate parameter set to a second system message or a second dedicated signaling;

a second transmitting module 153, configured to transmit the second system message or the second dedicated signaling to the terminal, to enable the terminal to obtain the power-saving signal candidate parameter set from the second system message or the second dedicated signaling, and determining the target power-saving signal parameter corresponding to the target BWP according to the power-saving signal candidate parameter set and the indication information in the power-saving signal configuration information.

As can be seen from the above embodiment, a power-saving signal candidate parameter set can be configured for the terminal, and the power-saving signal candidate parameter set is notified to the terminal through the second system message or the second dedicated signaling. In this way, the terminal can accurately obtain the power-saving signal parameters from the power-saving signal candidate parameter set when determining the power-saving signal parameters corresponding to the indication information in the power-saving signal configuration information, thereby improving the reliability of determining the power-saving signal parameter.

Figure 16:
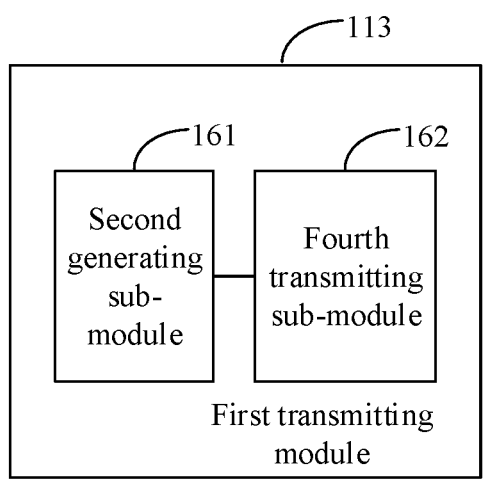
FIG. 16 is another block diagram of a device for monitoring a power-saving signal according to an embodiment of the disclosure.

In an embodiment, based on the device shown in FIG. 11, as shown in FIG. 16, the first BWP is a default BWP and/or an initial BWP for implementing a BWP auto-fallback function; the first transmitting sub-module 113 including:

a second generating sub-module 161, configured to generate a third system message or a third dedicated signaling carrying the power-saving signal configuration information, the power-saving signal configuration information includes a first default power-saving signal parameter corresponding to the default BWP and/or a second default power-saving signal parameter corresponding to the initial BWP a fourth transmitting sub-module 162, configured to transmit the third system message or the third dedicated signaling to the terminal.

As can be seen from the above embodiment, a third system message or a third dedicated signaling carrying the power-saving signal configuration information can be generated, the power-saving signal configuration information includes a first default power-saving signal parameter corresponding to the default BWP and/or a second default power-saving signal parameter corresponding to the initial BWP, and the third system message or the third dedicated signaling is transmitted to the terminal. So that the terminal can use the corresponding power-saving signal parameter over the default BWP and/or an initial BWP when the switching is performed from the currently activated BWP to the default BWP and/or an initial BWP. Therefore, adjustment of the power-saving signal parameter for implementing the BWP automatic back-off function is realized, the application range of the adjustment of the power saving signal parameter is further extended, and flexibility of the power-saving signal monitoring is improved.

In an embodiment, based on the device shown in FIG. 11, the first power-saving signal parameter corresponds to a serving cell serving the terminal, and power-saving signal parameter configurations corresponding to different serving cells are performed, respectively. In an embodiment, the serving cell includes a primary cell and a secondary cell for CA or DC.

In an embodiment, based on the device shown in FIG. 11, the power-saving signal includes a WUS and/or a GTS.

Figure 17:
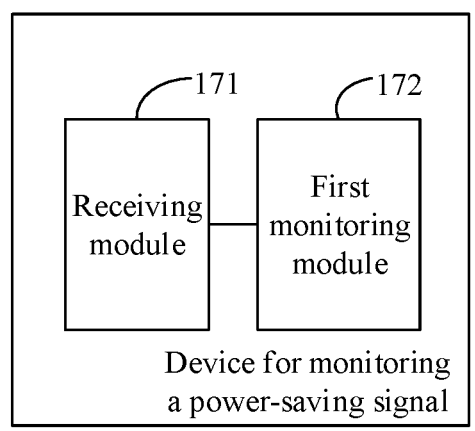
FIG. 17 is a block diagram of a device for monitoring a power-saving signal according to an embodiment of the disclosure.

FIG. 17 is a block diagram of a device for monitoring a power-saving signal according to an embodiment of the disclosure, the device is applied to a terminal for which at least one bandwidth portion BWP is configured by a base station, the device including:

a receiving module 171, configured to receive power-saving signal configuration information from a base station, the power-saving signal configuration information is configured for indicating to monitor the power-saving signal on a first BWP using the first power-saving signal parameter, the first power-saving signal parameter is a power-saving signal parameter configured for the first BWP by the base station to monitor the power-saving signal;

a first monitoring module 172, configured to perform the power-saving signal monitoring over the first BWP according to the first power-saving signal parameter based on the power-saving signal configuration information;

As can be seen from the above embodiment, by receiving the power-saving signal configuration information from a base station, the power-saving signal configuration information is configured for indicating to monitor the power-saving signal on a first BWP using the first power-saving signal parameter, and the first power-saving signal parameter is a power-saving signal parameter configured for the first BWP by the base station to monitor the power-saving signal; and performing the power-saving signal monitoring over the first BWP according to the first power-saving signal parameter based on the power-saving signal configuration information, dynamic configuration of power-saving signal parameters for monitoring a power-saving signal on each BWP can be realized, flexibility of power-saving signal parameter configuration can be improved, and power consumption for monitoring power-saving signal can be reduced.

Figure 18:
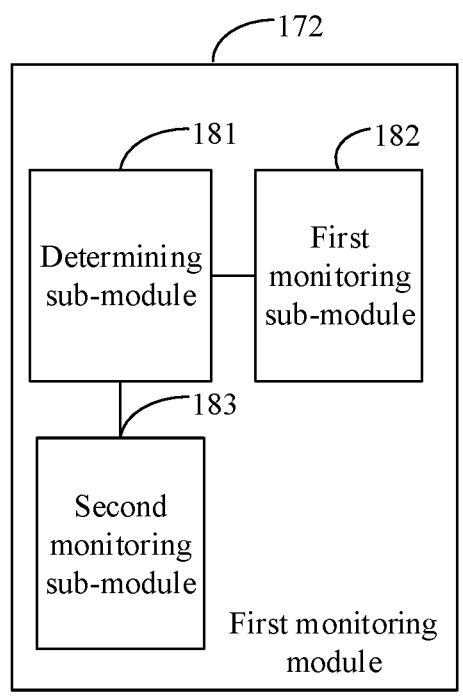
FIG. 18 is another block diagram of a device for monitoring a power-saving signal according to an embodiment of the disclosure.

In an embodiment, based on the device shown in FIG. 17, as shown in FIG. 18, the first BWP is any one of BWPs which are configured for the terminal by the base station, the power-saving signal configuration information includes a binding relationship between the BWPs which are configured for the terminal by the base station and power-saving signal parameters;

the first monitoring module 172 may include:

a determining sub-module 181, configured to determine whether the binding relationship includes a target power-saving signal parameter bound to a target BWP in response that a switching is performed from a currently activated BWP to the target BWP;

a first monitoring sub-module 182, configured to, response that the binding relationship includes the target power-saving signal parameter bound to the target BWP, perform the power-saving signal monitoring over the target BWP according to the target power-saving signal parameter;

a second monitoring sub-module 183, configured to, in response that the binding relationship does not include the target power-saving signal parameter bound to the target BWP, not perform an operation of monitoring the power-saving signal over the target BWP. In other words, for example, the second monitoring sub-module may fall back to the PDCCH monitoring mechanism and/or the PDSCH monitoring mechanism.

In an embodiment, based on the device shown in FIG. 18, the binding relationship includes one-to-one correspondences between the BWPs and the power-saving signal parameters and/or many-to-one correspondences between the BWPs and the power saving signal parameters.

Figure 19:
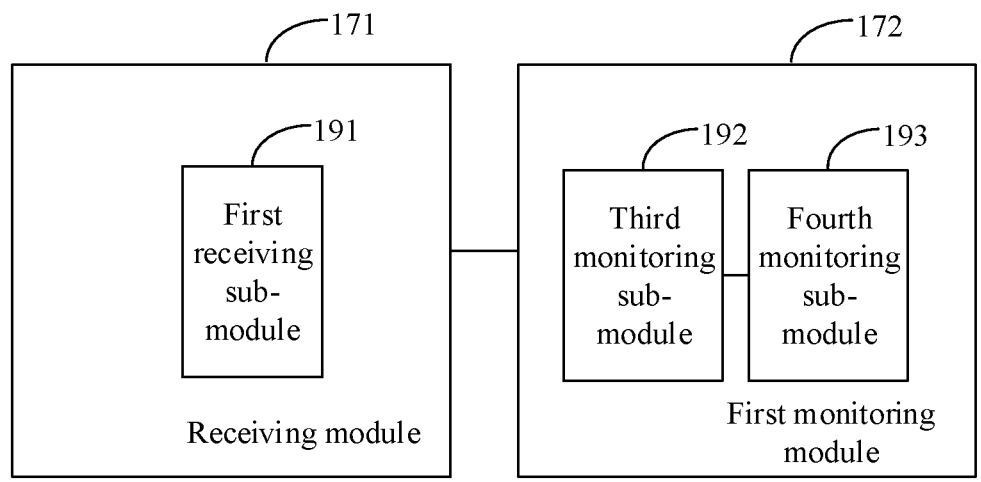
FIG. 19 is another block diagram of a device for monitoring a power-saving signal according to an embodiment of the disclosure.

In an embodiment, based on the device shown in FIG. 17, as shown in FIG. 19, the first BWP is a target BWP that the base station indicates the terminal for a BWP switching; the receiving module 171 includes:

a first receiving sub-module 191, configured to receive a BWP switching command carrying the power-saving signal configuration information from the base station, the power-saving signal configuration information includes a target power-saving signal parameter corresponding to the target BWP or indication information for characterizing a target power-saving signal parameter corresponding to the target BWP;

the first monitoring module 172 includes:

a third monitoring sub-module 192, configured to, in response that the power-saving signal configuration information includes the target power-saving signal parameter corresponding to the target BWP, perform the power-saving signal monitoring over the target BWP according to the target power-saving signal parameter;

a fourth monitoring sub-module 193, configured to, in response that the power-saving signal configuration information includes the indication information for characterizing the target power-saving signal parameter corresponding to the target BWP, determine the target power-saving signal parameter corresponding to the indication information according to a power-saving signal candidate parameter set configured for the terminal by the base station and the power-saving signal configuration information, and perform the power-saving signal monitoring over the target BWP according to the target power-saving signal parameter.

As can be seen from the above embodiment, a BWP switching command carrying the power-saving signal configuration information is received from the base station, the power-saving signal configuration information includes a target power-saving signal parameter corresponding to the target BWP or indication information for characterizing a target power-saving signal parameter corresponding to the target BWP; in response that the power-saving signal configuration information includes the target power-saving signal parameter corresponding to the target BWP, the power-saving signal monitoring over the target BWP is performed according to the target power-saving signal parameter; in response that the power-saving signal configuration information includes the indication information for characterizing the target power-saving signal parameter corresponding to the target BWP, the target power-saving signal parameter corresponding to the indication information is determined according to a power-saving signal candidate parameter set configured for the terminal by the base station and the power-saving signal configuration information; and the power-saving signal monitoring over the target BWP is performed according to the corresponding target power-saving signal parameter. Therefore, adjustment of the power-saving signal parameter for BWP switching is realized, and efficiency of the power-saving signal monitoring is further improved.

Figure 20:
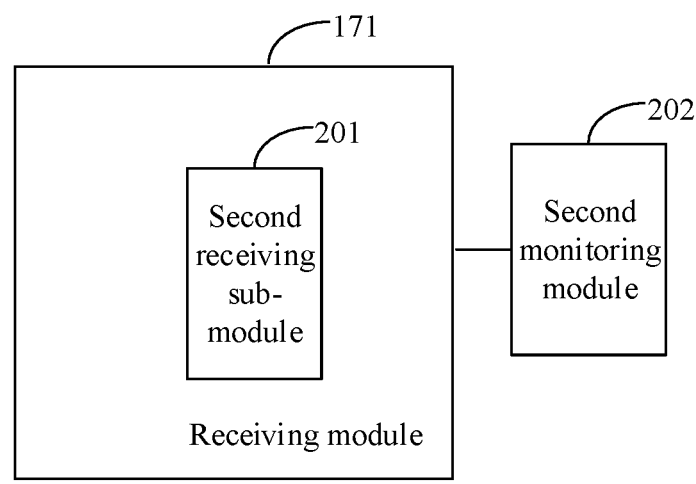
FIG. 20 is another block diagram of a device for monitoring a power-saving signal according to an embodiment of the disclosure.

In an embodiment, based on the device shown in FIG. 17, as shown in FIG. 20, the first BWP is a target BWP that the base station indicates the terminal for a BWP switching;

the receiving module 171 may include:

a second receiving sub-module 201, configured to receive a BWP switching command carrying the power-saving signal configuration information from the base station, the power-saving signal configuration information does not include a target power-saving signal parameter corresponding to the target BWP or indication information for characterizing a target power-saving signal parameter corresponding to the target BWP;

the device may further include:

a second monitoring module 202, configured to not perform the operation of monitoring the power-saving signal over the target BWP. In other words, for example, the second monitoring module may fall back to the PDCCH monitoring mechanism and/or the PDSCH monitoring mechanism.

Figure 21:
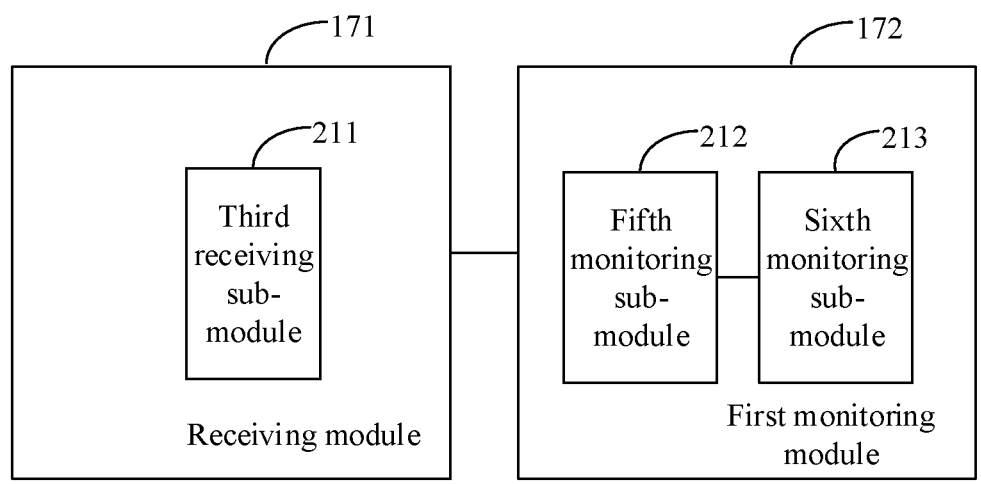
FIG. 21 is another block diagram of a device for monitoring a power-saving signal according to an embodiment of the disclosure.

In an embodiment, based on the device shown in FIG. 17, as shown in FIG. 21, the first BWP is a default BWP and/or an initial BWP for implementing a BWP auto-fallback function;

the receiving module 171 may include:

a third receiving sub-module 211, configured to receive a system message or a dedicated signaling carrying the power-saving signal configuration information from the base station, the power-saving signal configuration information includes a first default power-saving signal parameter corresponding to the default BWP and/or a second default power-saving signal parameter corresponding to the initial BWP;

the first monitoring module 172 may include:

a fifth monitoring sub-module 212, configured to, in response to falling back from a currently activated BWP to the default BWP, perform the power-saving signal monitoring over the default BWP according to the first default power-saving signal parameter corresponding to the default BWP;

a sixth monitoring sub-module 213, configured to, in response to falling back from a currently activated BWP to the initial BWP, perform the power-saving signal monitoring over the initial BWP according to the second default power-saving signal parameter corresponding to the initial BWP.

As can be seen from the above embodiment, a system message or a dedicated signaling carrying the power-saving signal configuration information is received from the base station, the power-saving signal configuration information includes a first default power-saving signal parameter corresponding to the default BWP and/or a second default power-saving signal parameter corresponding to the initial BWP; in response to falling back from a currently activated BWP to the default BWP, the power-saving signal monitoring over the default BWP is performed according to the first default power-saving signal parameter corresponding to the default BWP; in response to falling back from a currently activated BWP to the initial BWP, the power-saving signal monitoring over the initial BWP is performed according to the second default power-saving signal parameter corresponding to the initial BWP. Therefore, adjustment of the power-saving signal parameter for implementing the auto-fallback function of the BWP is realized, the application range of the power-saving signal parameter configuration of the BWP is further extended, and flexibility of monitoring the power-saving signal is improved.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

Accordingly, the present disclosure also provides a non-transitory computer readable storage medium having stored thereon a computer program for performing the method for monitoring a power-saving signal according to any one of FIG. 1 to FIG. 7.

Accordingly, the present disclosure also provides a non-transitory computer readable storage medium having stored thereon a computer program for performing the method for monitoring a power-saving signal according to any one of FIG. 8 to FIG. 10.

Accordingly, the present disclosure also provides a device for monitoring a power-saving signal, applied to a base station configuring at least one Bandwidth Portion (BWP) for a terminal, the device including:

a processor;

a memory for storing processor-executable instructions;

the processor is configured to:

for the first BWP, configure a corresponding first BWP inactive timer;

for a first BWP, configure a first power-saving signal parameter for monitoring the power-saving signal;

generate power-saving signal configuration information, the power-saving signal configuration information is configured for indicating to perform a power-saving signal monitoring over the first BWP using the first power-saving signal parameter; and transmit the power-saving signal configuration information to the terminal, to enable the terminal to perform the power-saving signal monitoring over the first BWP according to the first power-saving signal parameter based on the power-saving signal configuration information.

Figure 22:
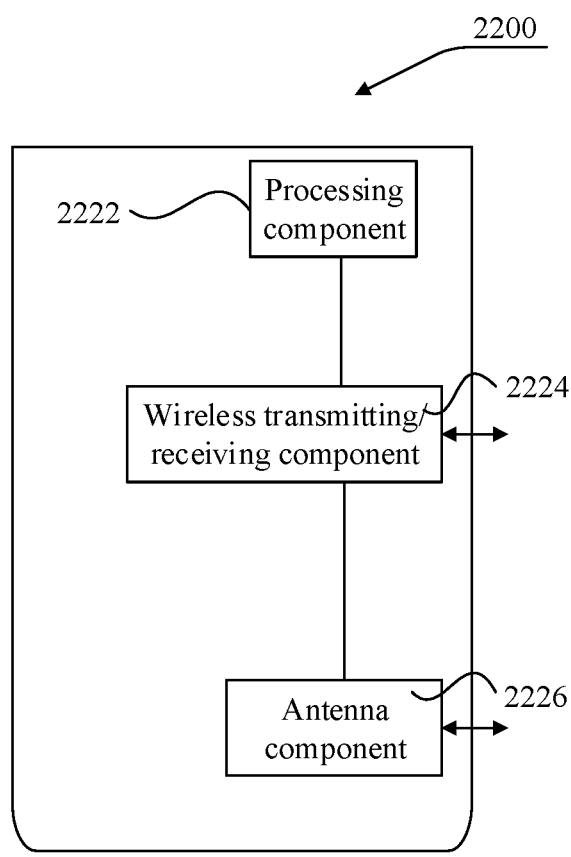
FIG. 22 is a schematic structural diagram of a device for monitoring a power-saving signal according to an embodiment of the disclosure.

As shown in FIG. 22, FIG. 22 is a schematic structural diagram of a device for monitoring a power-saving signal according to an embodiment of the disclosure. Device 2200 may be provided as a base station. Referring to FIG. 22, device 2200 includes a processing component 2222 (which may further include one or more processors), a wireless transmitting/receiving component 2224, an antenna component 2226, and a signal processing portion specific to the wireless interface.

One of the processors in the processing component 2222 may be configured to perform any one of the method for monitoring power-saving signal described above.

Accordingly, the present disclosure also provides a device for monitoring a power-saving signal, applied to a terminal for which at least one bandwidth portion BWP is configured by a base station, the device including:

a processor;

a memory for storing processor-executable instructions;

the processor is configured to:

receive power-saving signal configuration information from a base station, the power-saving signal configuration information is configured for indicating to monitor the power-saving signal on a first BWP using the first power-saving signal parameter, the first power-saving signal parameter is a power-saving signal parameter configured for the first BWP by the base station to monitor the power-saving signal;

perform the power-saving signal monitoring over the first BWP according to the first power-saving signal parameter based on the power-saving signal configuration information.

Figure 23:
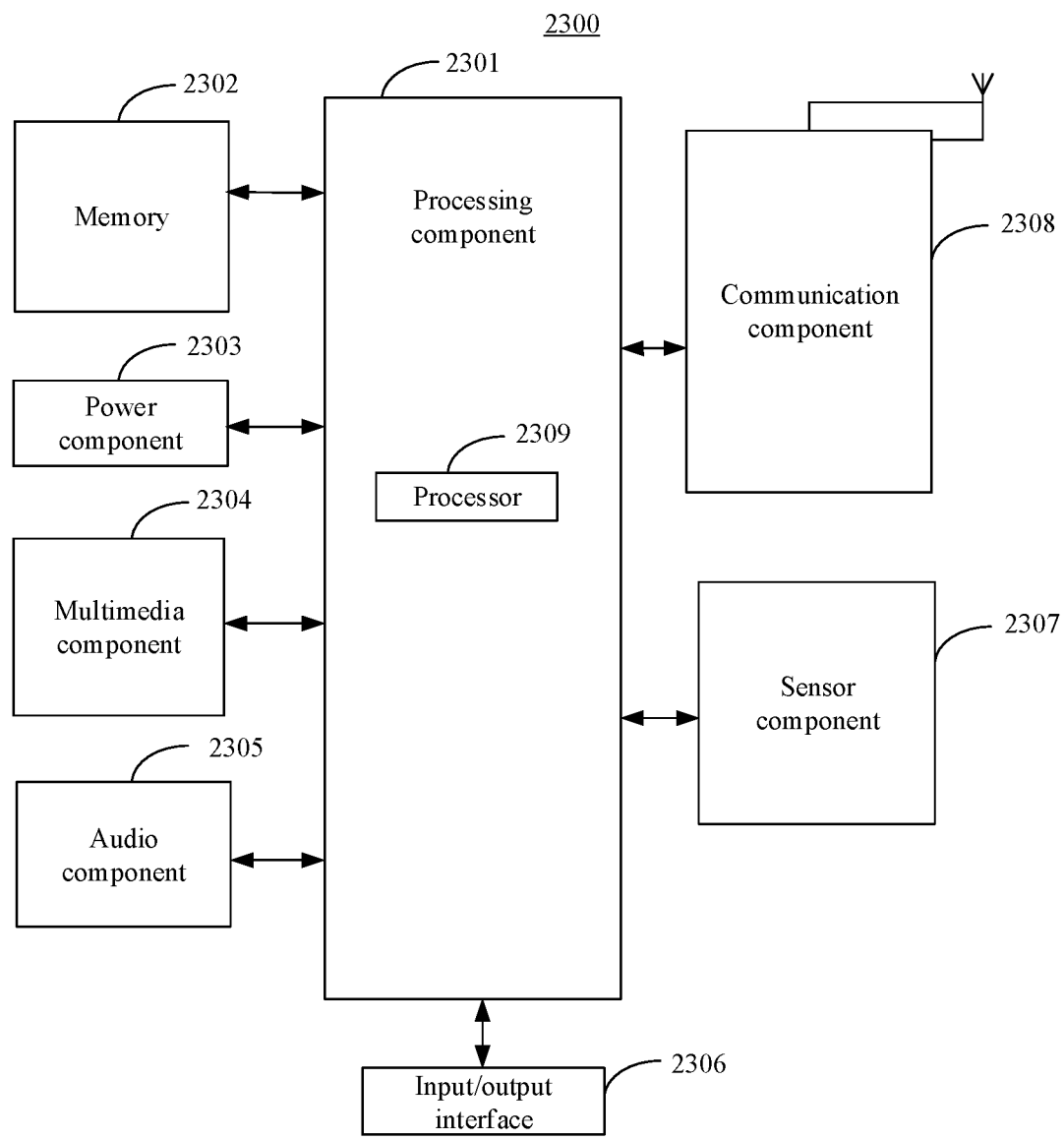
FIG. 23 is a schematic structural diagram of a device for monitoring a power-saving signal according to an embodiment of the disclosure.

FIG. 23 is a schematic structural diagram of a device for monitoring a power-saving signal according to an embodiment of the disclosure. As shown in FIG. 23, according to an exemplary embodiment, the illustrated device 2300 for monitoring power-saving signal may be a computer, a mobile phone, a digital broadcast terminal, a messaging device, a game console, a tablet device, a medical device, an exercise device, a personal digital assistant, and the like.

Referring to FIG. 23, the device 2300 may include one or more of the following components: a processing component 2301, a memory 2302, a power component 2303, a multimedia component 2304, an audio component 2305 an input/output (I/O) interface 2306, a sensor component 2307, and a communication component 2308.

The processing component 2301 typically controls overall operations of the device 2300, such as the operations associated with display, telephone calls, data communications, camera operations, and recording operations. The processing component 2301 may include one or more processors 2309 to execute instructions to perform all or part of the steps in the above described methods. Moreover, the processing component 2301 may include one or more modules which facilitate the interaction between the processing component 2301 and other components. For instance, the processing component 2301 may include a multimedia module to facilitate the interaction between the multimedia component 2304 and the processing component 2301.

The memory 2302 is configured to store various types of data to support the operation of the device 2300. Examples of such data include instructions for any applications or methods operated on the device 2300, contact data, phonebook data, messages, pictures, video, etc. The memory 2302 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2303 provides power to various components of the device 2300. The power component 2303 may include a power management system, one or more power sources, and any other components associated with the generation, management, and distribution of power in the device 2300.

The multimedia component 2304 includes a screen providing an output interface between the device 2300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2304 includes a front camera and/or a rear camera. The front camera and/or the rear camera may receive an external multimedia datum while the device 2300 is in an operation mode, such as a photographing mode or a video mode. Each of the front camera and the rear camera may be a fixed optical lens system or have focus and optical zoom capability.

The audio component 2305 is configured to output and/or input audio signals. For example, the audio component 2305 includes a microphone ("MIC"), and the MIC is configured to receive an external audio signal when the device 2300 is in an operation mode, such as a call mode, a recording mode, and a voice recognition mode. The received audio signal may be further stored in the memory 2302 or transmitted via the communication component 2308. In some embodiments, the audio component 2305 further includes a speaker to output audio signals.

The I/O interface 2306 provides an interface between the processing component 2301 and peripheral interface modules, such as a keyboard, a click wheel, buttons, and the like. The buttons may include, but are not limited to, a home button, a volume button, a starting button, and a locking button.

The sensor component 2307 includes one or more sensors to provide status assessments of various aspects of the device 2300. For instance, the sensor component 2307 may detect an open/closed status of the device 2300 relative positioning of components, e.g., the display and the keypad, of the device 2300, the sensor component 2307 may further detect a change in position of the device 2300 or a component of the device 2300, a presence or absence of user contact with the device 2300, an orientation or an acceleration/deceleration of the device 2300, and a change in temperature of the device 2300. The sensor component 2307 may include a proximity sensor configured to detect the presence of nearby objects without any physical contact. The sensor component 2307 may also include a light sensor, such as a Complementary Metal Oxide Semiconductor (CMOS) or Charge Coupled Device (CCD) image sensor, configured for use in imaging applications. In some embodiments, the sensor component 2307 may also include an accelerometer sensor, a gyroscope sensor, a magnetic sensor, a pressure sensor, or a temperature sensor.

The communication component 2308 is configured to facilitate communication, wired or wirelessly, between the device 2300 and other devices. The device 2300 can access a wireless network based on a communication standard, such as a Wireless Fidelity (Wi-Fi) network, a 2nd-Generation (2G) or 3rd-Generation (3G) network or a combination thereof. In one exemplary embodiment, the communication component 2308 receives a broadcast signal or broadcast associated information from an external broadcast management system via a broadcast channel. In one exemplary embodiment, the communication component 2308 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2302, executable by the processor 2309 in the device 2300, for performing the above-described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

When the instructions in the storage medium are executed by the processor, the device 2300 is enabled to perform any one of the method for monitoring power-saving signal described above.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims. It will be appreciated that the present invention is not limited to the exact construction that has been described above and illustrated in the accompanying drawings, and that various modifications and changes can be made without departing from the scope thereof. It is intended that the scope of the invention only be limited by the appended claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for monitoring a power-saving signal, applied to a base station configuring at least one Bandwidth Portion (BWP) for a terminal, the method comprising:

for a first BWP, configuring a first power-saving signal parameter for monitoring the power-saving signal;

generating power-saving signal configuration information, wherein the power-saving signal configuration information is configured for indicating to perform a power-saving signal monitoring over the first BWP using the first power-saving signal parameter; and transmitting the power-saving signal configuration information to the terminal, to enable the terminal to perform the power-saving signal monitoring over the first BWP according to the first power-saving signal parameter based on the power-saving signal configuration information, wherein the first BWP is any one of BWPs which are configured for the terminal by the base station:

wherein transmitting the power-saving signal configuration information to the terminal comprises;

establishing a binding relationship between the BWPs which are configured for the terminal by the base station and power-saving signal parameters; and adding the binding relationship to the power-saving signal configuration information; and transmitting the power-saving signal configuration information carrying the binding relationship to the terminal.

2. The method of claim 1, wherein the first power-saving signal parameter comprises at least one of:

a first information configured for indicating a transmission period of the power-saving signal;

a second information configured for indicating a start-end time of the power-saving signal; or a third information configured for indicating a duration of the power saving signal.

3. The method of claim 2, wherein the start-end time of the power-saving signal comprise at least one of a starting time of the power-saving signal or an ending time of the power-saving signal within the transmission period, wherein each of the starting time and the ending time is a respective offset value for a specified reference point.

4. The method of claim 1, wherein the binding relationship comprises at least one of one-to-one correspondences between the BWPs and the power-saving signal parameters or many-to-one correspondences between the BWPs and the power-saving signal parameters.

5. The method of claim 1, wherein transmitting the power-saving signal configuration information carrying the binding relationship to the terminal comprises:

adding the power-saving signal configuration information to a first system message or a first dedicated signaling; and transmitting the first system message or the first dedicated signaling to the terminal, to enable the terminal to obtain the power-saving signal configuration information from the first system message or the first dedicated signaling.

6. The method of claim 1, wherein the first BWP is a target BWP that the base station indicates the terminal for a BWP switching;

wherein transmitting the power-saving signal configuration information to the terminal comprises:

generating a BWP switching command carrying the power-saving signal configuration information, wherein the power-saving signal configuration information comprises a target power-saving signal parameter corresponding to the target BWP or indication information for indicating a target power-saving signal parameter corresponding to the target BWP; and transmitting the BWP switching command to the terminal.

7. The method of claim 6, further comprising:

configuring a power-saving signal candidate parameter set for the terminal;

adding the power-saving signal candidate parameter set to a second system message or a second dedicated signaling; and transmitting the second system message or the second dedicated signaling to the terminal, to enable the terminal to obtain the power-saving signal candidate parameter set from the second system message or the second dedicated signaling, and determining the target power-saving signal parameter corresponding to the target BWP according to the power-saving signal candidate parameter set and the indication information in the power-saving signal configuration information.

8. The method of claim 1, wherein the first BWP is at least one of a default BWP or an initial BWP for implementing a BWP auto-fallback function;

wherein transmitting the power-saving signal configuration information to the terminal comprises:

generating a third system message or a third dedicated signaling carrying the power-saving signal configuration information, wherein the power-saving signal configuration information comprises at least one of a first default power-saving signal parameter corresponding to the default BWP or a second default power-saving signal parameter corresponding to the initial BWP; and transmitting the third system message or the third dedicated signaling to the terminal.

9. The method of claim 1, wherein the first power-saving signal parameter corresponds to a serving cell serving the terminal, and power-saving signal parameter configurations corresponding to different serving cells are performed, respectively.

10. The method of claim 9, wherein the serving cell comprises a primary cell and a secondary cell for carrier aggregation (CA) or dual connectivity (DC).

11. The method of claim 1, wherein the power-saving signal comprises at least one of a wake-up signal (WUS) or a go-to sleep signal (GTS).

12. A method for monitoring a power-saving signal, applied to a terminal for which at least one Bandwidth Portion (BWP) is configured by a base station, the method comprising:

receiving power-saving signal configuration information from a base station, wherein the power-saving signal configuration information is configured for indicating to monitor the power-saving signal over a first BWP using the first power-saving signal parameter, and the first power-saving signal parameter is a power-saving signal parameter configured for the first BWP by the base station to monitor the power-saving signal; and performing the power-saving signal monitoring over the first BWP according to the first power-saving signal parameter based on the power-saving signal configuration information, wherein the first BWP is any one of BWPs which are configured for the terminal by the base station, and the power-saving signal configuration information comprises a binding relationship between the BWPs which are configured for the terminal by the base station and power-saving signal parameters, wherein performing the power-saving signal monitoring over the first BWP according to the first power-saving signal parameter based on the power-saving signal configuration information comprises;

determining whether the binding relationship comprises a target power-saying signal parameter bound to a target BWP in response that a switching is performed from a currently activated BWP to the target BWP:

in response that the binding relationship comprises the target power-saving signal parameter bound to the target BWP, performing the power-saving signal monitoring over the target BWP according to the target power-saving signal parameter; or in response that the binding relationship does not comprise the target power-saving signal parameter bound to the target BWP, not performing an operation of monitoring the power-saving signal over the target BWP, and falling back to at least one of a physical downlink control channel (PDCCH) monitoring mechanism or a physical downlink shared channel (PDSCH) monitoring mechanism.

13. The method of claim 12, wherein the first BWP is a target BWP that the base station indicates the terminal for a BWP switching;

wherein receiving the power saving signal configuration information from the base station comprises:

receiving a BWP switching command carrying the power-saving signal configuration information from the base station, wherein the power-saving signal configuration information comprises a target power-saving signal parameter corresponding to the target BWP or indication information for indicating a target power-saving signal parameter corresponding to the target BWP;

wherein monitoring a first power-saving signal corresponding to the first power-saving signal parameter over the first BWP according to the power-saving signal configuration information comprises:

in response that the power-saving signal configuration information comprises the target power-saving signal parameter corresponding to the target BWP, performing the power-saving signal monitoring over the target BWP according to the target power-saving signal parameter; or in response that the power-saving signal configuration information comprises the indication information for indicating the target power-saving signal parameter corresponding to the target BWP, determining the target power-saving signal parameter corresponding to the indication information according to a power-saving signal candidate parameter set configured for the terminal by the base station and the power-saving signal configuration information, and performing the power-saving signal monitoring over the target BWP according to the target power-saving signal parameter.

14. The method of claim 12, wherein the first BWP is a target BWP that the base station indicates the terminal for a BWP switching;

wherein receiving the power-saving signal configuration information from the base station comprises:

receiving a BWP switching command carrying the power-saving signal configuration information from the base station, wherein the power-saving signal configuration information does not comprise a target power-saving signal parameter corresponding to the target BWP or indication information for indicating a target power-saving signal parameter corresponding to the target BWP, the method further comprises:

not performing the operation of monitoring the power-saving signal over the target BWP, and falling back to at least one of a physical downlink control channel (PDCCH) monitoring mechanism or a physical downlink shared channel (PDSCH) monitoring mechanism.

15. The method of claim 12, wherein the first BWP is at least one a default BWP or an initial BWP for implementing a BWP auto-fallback function;

wherein receiving the power-saving signal configuration information from the base station comprises:

receiving a system message or a dedicated signaling carrying the power-saving signal configuration information from the base station, wherein the power-saving signal configuration information comprises at least one of a first default power-saving signal parameter corresponding to the default BWP or a second default power-saving signal parameter corresponding to the initial BWP;

wherein monitoring a first power-saving signal corresponding to the first power-saving signal parameter over the first BWP according to the power-saving signal configuration information comprises:

in response to falling back from a currently activated BWP to the default BWP, performing the power-saving signal monitoring over the default BWP according to the first default power-saving signal parameter corresponding to the default BWP; or in response to falling back from a currently activated BWP to the initial BWP, performing the power-saving signal monitoring over the initial BWP according to the second default power-saving signal parameter corresponding to the initial BWP.

16. A device for monitoring a power-saving signal, applied to a terminal for which at least one bandwidth portion BWP is configured by a base station, the device comprising:

a processor;

a memory for storing processor-executable instructions;

wherein the processor is configured to:

receive power-saving signal configuration information from a base station, wherein the power-saving signal configuration information is configured for indicating to monitor the power-saving signal over a first BWP using the first power-saving signal parameter, and the first power-saving signal parameter is a power-saving signal parameter configured for the first BWP by the base station to monitor the power-saving signal; and perform the power-saving signal monitoring over the first BWP according to the first power-saving signal parameter based on the power-saving signal configuration information, wherein the first BWP is any one of BWPs which are configured for the terminal by the base station, and the power-saving signal configuration information comprises a binding relationship between the BWPs which are configured for the terminal by the base station and power-saving signal parameters, wherein the processor is further configured to:

determine whether the binding relationship comprises a target power-saving signal parameter bound to a target BWP in response that a switching is performed from a currently activated BWP to the target BWP;

in response that the binding relationship comprises the target power-saving signal parameter bound to the target BWP, perform the power-saving signal monitoring over the target BWP according to the target power-saving signal parameter; or in response that the binding relationship does not comprise the target power-saving signal parameter bound to the target BWP, not perform an operation of monitoring the power-saving signal over the target BWP, and fall back to at least one of a physical downlink control channel (PDCCH) monitoring mechanism or a physical downlink shared channel (PDSCH) monitoring mechanism.

17. The device of claim 16, wherein the first BWP is any one of BWPs which are configured for the terminal by the base station, wherein the power-saving signal configuration information comprises a binding relationship between the BWPs which are configured for the terminal by the base station and power-saving signal parameters;

wherein the processor is further configured to:

determine whether the binding relationship comprises a target power-saving signal parameter bound to a target BWP in response that a switching is performed from a currently activated BWP to the target BWP;

in response that the binding relationship comprises the target power-saving signal parameter bound to the target BWP, perform the power-saving signal monitoring over the target BWP according to the target power-saving signal parameter; or in response that the binding relationship does not comprise the target power-saving signal parameter bound to the target BWP, not perform an operation of monitoring the power-saving signal over the target BWP, and fall back to at least one of a physical downlink control channel (PDCCH) monitoring mechanism or a physical downlink shared channel (PDSCH) monitoring mechanism.

18. The device of claim 16, wherein the first BWP is a target BWP that the base station indicates the terminal for a BWP switching;

wherein the processor is further configured to:

receive a BWP switching command carrying the power-saving signal configuration information from the base station, wherein the power-saving signal configuration information comprises a target power-saving signal parameter corresponding to the target BWP or indication information for indicating a target power-saving signal parameter corresponding to the target BWP;

in response that the power-saving signal configuration information comprises the target power-saving signal parameter corresponding to the target BWP, perform the power-saving signal monitoring over the target BWP according to the target power-saving signal parameter; or in response that the power-saving signal configuration information comprises the indication information for indicating the target power-saving signal parameter corresponding to the target BWP, determine the target power-saving signal parameter corresponding to the indication information according to a power-saving signal candidate parameter set configured for the terminal by the base station and the power-saving signal configuration information, and perform the power-saving signal monitoring over the target BWP according to the target power-saving signal parameter.

* * * * *